(12) United States Patent
Pozos et al.

(10) Patent No.: US 10,121,249 B2
(45) Date of Patent: Nov. 6, 2018

(54) ENHANCED VISUALIZATION OF AREAS OF INTEREST IN IMAGE DATA

(71) Applicant: Baja Education, Inc., San Diego, CA (US)

(72) Inventors: Robert Pozos, San Diego, CA (US); Jose Agraz, Beaverton, OR (US); Alicia Leon, San Diego, CA (US); Brent Baccetti, Long Beach, CA (US)

(73) Assignee: BAJA EDUCATION, INC., San Diego, CA (US)

( * ) Notice: Subject to any disclaimer, the term of this patent is extended or adjusted under 35 U.S.C. 154(b) by 39 days.

(21) Appl. No.: 15/339,604

(22) Filed: Oct. 31, 2016

(65) Prior Publication Data

US 2017/0287135 A1    Oct. 5, 2017

Related U.S. Application Data

(60) Provisional application No. 62/317,210, filed on Apr. 1, 2016.

(51) Int. Cl.
| | |
|---|---|
| *G06K 9/00* | (2006.01) |
| *G06T 7/00* | (2017.01) |
| *G06T 11/60* | (2006.01) |
| *G06F 3/16* | (2006.01) |
| *G10H 1/00* | (2006.01) |
| *G10H 1/38* | (2006.01) |

(52) U.S. Cl.
CPC ............ *G06T 7/0042* (2013.01); *G06F 3/165* (2013.01); *G06T 7/0081* (2013.01); *G06T 11/60* (2013.01); *G10H 1/0008* (2013.01); *G10H 1/0066* (2013.01); *G10H 1/38* (2013.01); *G06T 2207/10028* (2013.01); *G06T 2207/20072* (2013.01); *G10H 2210/391* (2013.01); *G10H 2220/005* (2013.01); *G10H 2220/126* (2013.01); *G10H 2220/441* (2013.01)

(58) Field of Classification Search
CPC ................... G06T 2200/04; G06T 7/80; G06T 2207/10012; G06T 19/00
USPC ....... 382/103, 108, 109, 154, 190, 278, 282, 382/291; 348/143, 144
See application file for complete search history.

(56) References Cited

U.S. PATENT DOCUMENTS

| | | | |
|---|---|---|---|
| 5,085,116 A | 2/1992 | Nakata et al. | |
| 5,689,078 A | 11/1997 | McClard et al. | |
| 5,819,016 A * | 10/1998 | Watanabe | G01B 11/002 345/419 |
| 6,083,163 A | 7/2000 | Wegner et al. | |
| 6,449,501 B1 | 9/2002 | Reuss | |

(Continued)

FOREIGN PATENT DOCUMENTS

WO    1999/013455 A1    3/1999

*Primary Examiner* — Yosef Kassa
(74) *Attorney, Agent, or Firm* — Procopio, Cory, Hargreaves & Savitch LLP

(57) ABSTRACT

A method for generating visual enhancement of areas of interest in images includes receiving data representing a plurality of images in a sequence of images; analyzing the plurality images to identify respective three dimensional (3D) locations of one or more areas of interest in the plurality of images; visually enhancing the one or more of the identified areas of interest in the plurality of the images in the sequence of images; and communicating the visually enhanced image data to a display device to be displayed.

17 Claims, 14 Drawing Sheets

(56) References Cited

U.S. PATENT DOCUMENTS

| | | | |
|---|---|---|---|
| 6,512,892 B1 * | 1/2003 | Montgomery | H04N 13/0011 348/E13.008 |
| 6,982,710 B2 * | 1/2006 | Salomie | G06T 17/20 345/420 |
| 7,135,635 B2 | 11/2006 | Childs et al. | |
| 7,138,575 B2 | 11/2006 | Childs, Jr. et al. | |
| 7,312,725 B2 * | 12/2007 | Berson | G01C 23/00 340/461 |
| 7,365,261 B2 | 4/2008 | Hirano | |
| 7,486,291 B2 * | 2/2009 | Berson | G01C 23/00 340/980 |
| 7,511,213 B2 | 3/2009 | Childs, Jr. et al. | |
| 7,583,391 B2 * | 9/2009 | Lu | G01B 11/25 356/601 |
| 7,629,528 B2 | 12/2009 | Childs, Jr. et al. | |
| 7,657,157 B2 | 2/2010 | Okabayashi et al. | |
| 7,697,029 B2 * | 4/2010 | Ozaki | G01S 7/497 348/118 |
| 7,982,767 B2 * | 7/2011 | Berson | B64D 47/08 348/144 |
| 8,009,898 B2 * | 8/2011 | Kim | H04N 13/239 382/154 |
| 8,149,236 B2 * | 4/2012 | Nakao | A61B 6/466 345/419 |
| 8,189,898 B2 * | 5/2012 | Yokota | C12Q 1/6837 382/133 |
| 8,243,123 B1 * | 8/2012 | Geshwind | H04N 13/0022 348/42 |
| 8,247,677 B2 | 8/2012 | Ludwig | |
| 8,401,276 B1 * | 3/2013 | Choe | G01C 11/06 345/419 |
| 8,564,655 B2 * | 10/2013 | Fujieda | G01B 11/0691 348/87 |
| 8,692,100 B2 | 4/2014 | Ludwig | |
| 2002/0002458 A1 | 1/2002 | Owen et al. | |
| 2003/0133700 A1 | 7/2003 | Uehara | |
| 2005/0055267 A1 | 3/2005 | Chasanoff et al. | |
| 2015/0201889 A1 | 7/2015 | Roginska et al. | |
| 2015/0213789 A1 | 7/2015 | Plott et al. | |

* cited by examiner

ENHANCED VISUALIZATION OF AREAS OF INTEREST IN IMAGE DATA

CROSS-REFERENCE TO RELATED APPLICATION

This application claims the benefit of U.S. Provisional Application No. 62/317,210, filed Apr. 1, 2016, the disclosure of which is incorporated herein in its entirety by reference.

BACKGROUND

Field

The present disclosure relates to combining audio and visual signals to enhance the interpretation and comprehension of data analysis.

Background

Data analysis relies on the visual inspection and subsequent mental analysis of images, photos, graphs and visual presentations of data. Frequently, these presentations fail to convey all important aspects of the data because of their complexity, volume, and incoherence which lead to cognitive overload. Due to the shortcomings of these presentations, the risk of misunderstanding of the data is great and therefore detrimental in any situation in which data interpretation is critical such as education, business, military operations etc.

SUMMARY

In one aspect, a system for generating visual enhancement of areas of interest in images is provided. The system includes a processing unit and a non-volatile memory communicatively coupled to the processing unit, the memory storing instructions for causing the processing unit to: receive data representing a plurality of images in a sequence of images; analyze the plurality images to identify respective three dimensional (3D) locations of one or more areas of interest in the plurality of images; visually enhance the one or more of the identified areas of interest in the plurality of the images in the sequence of images; and communicate the visually enhanced image data to a display device to be displayed.

In one aspect, a method for generating visual enhancement of areas of interest in images is provided. The method includes receiving data representing a plurality of images in a sequence of images; analyzing the plurality images to identify respective three dimensional (3D) locations of one or more areas of interest in the plurality of images; visually enhancing the one or more of the identified areas of interest in the plurality of the images in the sequence of images; and communicating the visually enhanced image data to a display device to be displayed.

In one aspect, a non-volatile computer readable medium storing instruction for causing a processing unit to perform a process is provided. The process includes receiving data representing a plurality of images in a sequence of images; analyzing the plurality images to identify respective three dimensional (3D) locations of one or more areas of interest in the plurality of images; visually enhancing the one or more of the identified areas of interest in the plurality of the images in the sequence of images; and communicating the visually enhanced image data to a display device to be displayed.

In one aspect, a system for generating sonification data associated with areas of interest in images is provided. The system includes a processing unit; and a non-volatile memory communicatively coupled to the processing unit, the memory storing instructions for causing the processing unit to: receive data indicating three dimensional (3D) locations of one or more areas of interest in a plurality of images in a sequence of images; based on the 3D locations, determine sonification data for the one or more areas of interest in the plurality of images, characteristics of the determined sonification data changing based on at least one of respective first, second and third coordinates of the 3D locations of the one or more areas of interest in each of the plurality of images; and export data indicative of the determined sonification data to be stored in a memory in association with the set of images.

In one aspect, a method of generating sonification associated with areas of interest in images is provided. The method includes receiving data indicating three dimensional (3D) locations of one or more areas of interest in a plurality of images in a sequence of images; based on the 3D locations, determining sonification data for the one or more areas of interest in the plurality of images, characteristics of the determined sonification data changing based on at least one of respective first, second and third coordinates of the 3D locations of the one or more areas of interest in each of the plurality of images; and exporting data indicative of the determined sonification data to be stored in a memory in association with the set of images.

In one aspect, a non-volatile computer readable medium storing instruction for causing a processing unit to perform a process is provided. The process includes receiving data indicating three dimensional (3D) locations of one or more areas of interest in a plurality of images in a sequence of images; based on the 3D locations, determining sonification data for the one or more areas of interest in the plurality of images, characteristics of the determined sonification data changing based on at least one of respective first, second and third coordinates of the 3D locations of the one or more areas of interest in each of the plurality of images; and exporting data indicative of the determined sonification data to be stored in a memory in association with the set of images.

Other features and advantages of the present disclosure should be apparent from the following description which illustrates, by way of example, aspects of the disclosure.

BRIEF DESCRIPTION OF THE DRAWINGS

The details of the present disclosure, both as to its structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in simplified form in order to avoid obscuring such concepts.

Audio sonification, using audio such as music, tones, etc., of selected image and/or graphical data has been found to solve common problems related to complexity, volume, and incoherence that lead to cognitive overload. By utilizing various input devices or motion tracking to select areas of interest in an image and/or graph, a user is able to not only animate and highlight visual data but also trigger certain audio parameters (e.g., musical parameters or non-musical parameters) to sonify the visual representation of data. Systems and methods described herein can combine audio and visual signals to enhance the interpretation and comprehension of image data analysis.

Figure 1:
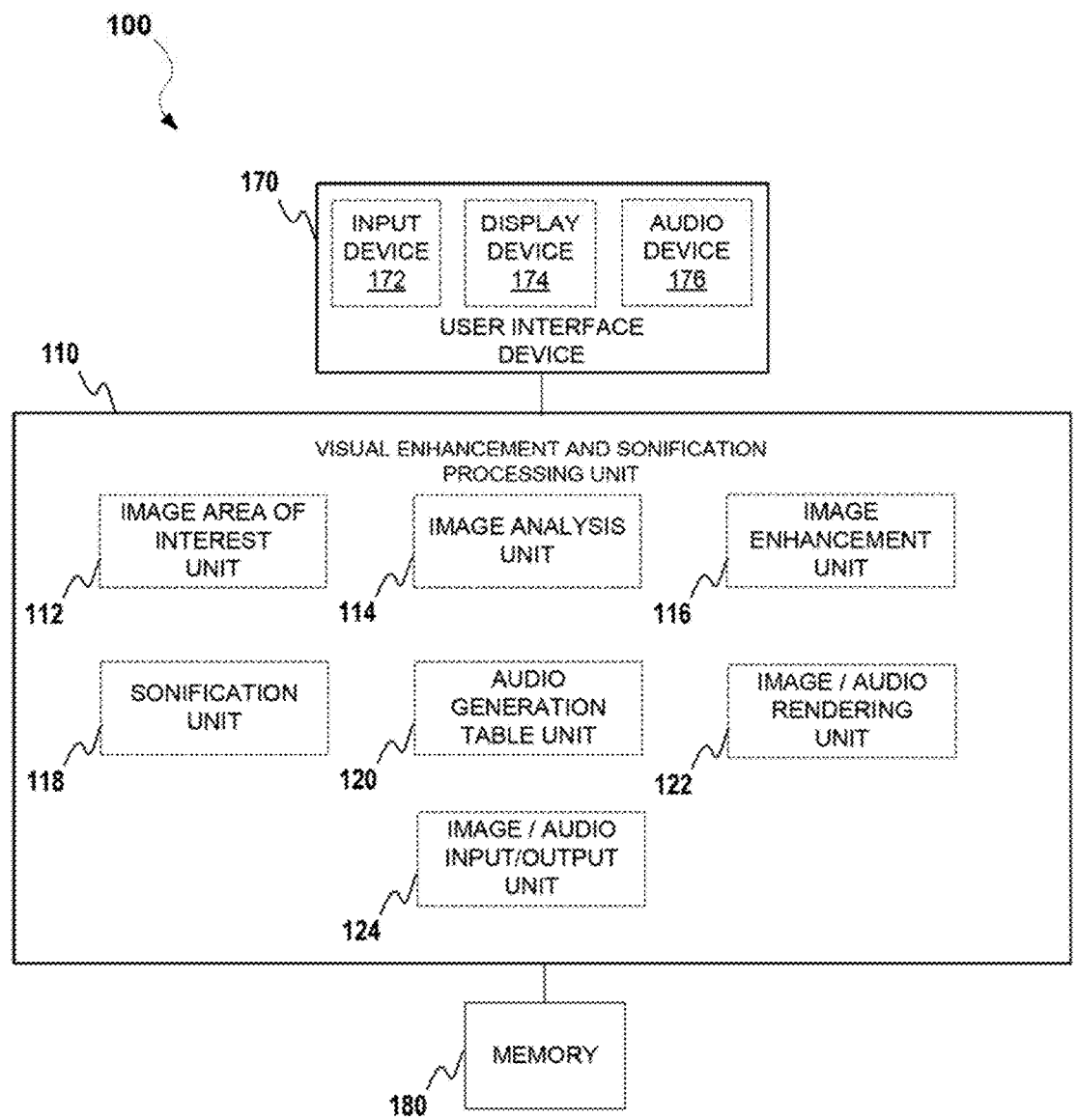
FIG. 1 is a block diagram of a system for generating visual enhancement and sonification for areas of interest within a plurality of images in a sequence of images.

FIG. 1 is a block diagram illustrating a system 100 for generating visual enhancement and sonification for areas of interest within a plurality of images in a sequence of images. As illustrated in FIG. 1, the system 100 may include a visual enhancement and sonification processing unit 110 (referred to from herein as the processing unit), a user interface device 170, and a memory 180.

The processing unit 110 may be, for example but not limited to, a desktop computer, a rack mount computer, a computer server, a mobile telephone, a smartphone, a tablet computer, etc., capable of communications with the user interface device 170, the memory 180 and one or more wired or wireless networks (not shown). One of ordinary skill in the art will appreciate that the processing unit 110 may include one or more communication units to communicate via the wired or wireless networks.

The user interface device 170 may include an input device 172, for example, but not limited to a keyboard, touch panel, mouse, or other human interface device, a display device 174, for example, but not limited to, a liquid crystal display (LCD), light emitting diode (LED) display, or other video display, and an audio device 176 such as loudspeakers such as stereo loudspeakers or other electro-acoustic device. One of ordinary skill in the art will appreciate that other input, display and audio devices may be used without departing from the scope of the various embodiments.

The processing unit 110 may be configured to control overall operation of the system 100 including control of the user interface device 170, and the memory 180. The processing unit 110 may be a programmable device, for example, but not limited to, a microprocessor (e.g., general-purpose processor, baseband modem processor, etc.) or microcontroller.

The processing unit 110 may include an image area of interest unit 112 configured to receive input, e.g., via the input device 172 and to identify one or more areas of interest in one or more images in a sequence of images (or video), an image analysis unit 114 configured to analyze the sequence of images to identify, based on the input identifying the areas of interest, three dimensional locations of the areas of interest in multiple images of the sequence of images, and an image enhancement unit 116 configured to visually enhance the identified areas of interest in the multiple images so as to highlight, enlarge, track or otherwise modify the areas of interest.

The processing unit 110 may also include a sonification unit 118 configured to determine sonification data to associate with the areas of interest in the sequence of images, the sonification data comprising audio data selectively chosen based on 3D locations of the areas of interest, an audio generation table unit 120 configured to construct audio generation tables defining characteristics used to enable the sonification unit 118 to modify (e.g., using modulation techniques, volume variation, tempo variation, etc.) audio data (e.g., music tracks or streams, musical notes and/or chords, non-musical sounds, etc.) based on multiple locations of the areas of interest in first, second and third coordinates (e.g., Cartesian coordinates, spherical coordinates, etc.).

The processing unit 110 may also include an image/audio rendering unit 122 configured to render the visually enhanced images on a video display such as the display device 174 and to simultaneously render the sonification data on an audio device such as the audio device 176. Simultaneous rendering of the visually enhanced images and the sonification data will result in the sounds produced by the sonification data predictively changing in real time as the 3D location of the areas of interest changes from image to image and while the appearance of the areas of interest changes due to the image enhancement. The processing unit 110 may also include an image/audio input/output unit 124 to retrieve image and audio data from or store enhanced image and audio data to the memory 180, to or from the user interface device 170 and/or to or from one or more wired or wireless networks.

Alternatively, the image area of interest unit 112, the image analysis unit 114, the image enhancement unit 116, the sonification unit 118, the audio generation table unit 120, the image/audio rendering unit 122 and or the image/audio input output unit 124 may be implemented as electronic circuitry separate from the processing unit 110.

The memory 180 may be configured to store operating systems and/or application programs for operation of the mobile communication device 100 that are executed by the processing unit 110, as well as to store application data and user data.

The image area of interest unit 112 receives inputs from the input device 172 defining areas of interest in a plurality of images. A variety of tools may be used to identify the areas of interest with the input device 172. The areas of interest may be identified by drawing lines of various shapes around the areas of interest. In one embodiment, each tool has a cursor and a tail component which can be manipulated according to the tool chosen. The cursor component can be a gif or png that can be manipulated in size, shape, color, and opacity. The tail component can be a gif or png that can be manipulated in size, shape, color, opacity, duration, velocity, density, and rotation. A mouse or touch pad may be used to draw straight lines, curved lines, geometric shapes such as lines, squares, rectangles, circles, ellipses, triangles, free hand traces, corrals and others. The areas of interest may be tracked with the image analysis unit 114 in each of the plurality of images using techniques such as object recognition, user input, etc. The areas of interest may then be enhanced visually by the image enhancement unit 116.

The image analysis unit 114 may use changes in size of the areas of interest to identify an object making up the areas of interest moving in a direction perpendicular to the image (referred to as the Z axis). In this way, the image analysis unit 114 is able to generate the 3D locations of the areas of interest. The locations of the X and Y axes may be determined by the user positioning the cursor in the plane of the image. The Z axis may be determined by the user moving the scroll wheel on a mouse, for example, to change a position of the Z axis to a specific Z location.

The image enhancement unit 116 modifies the appearance of the areas of interest based on changes in the 3D locations of the areas of interest in the different images. The image enhancement unit 116 may mask, highlight, magnify, zoom, modify colors, blend colors, and trace or motion track the areas of interest based on the 3D locations.

The sonification unit 118 adds sounds (referred to as sonification) in association with the data created in the image area of interest unit 112, by choosing audio parameters that will be triggered by the 3D locations of the areas of interest. For example, the pitch, tempo and/or rhythm of any musical chord progression can change according to the movement of a cursor along X, Y, and/or Z axes and the pattern in the pitch change is specific to the movement of the areas of interest in the visualization which varies from one presentation to another. The sonification unit 118 also allows for the modulation of audio in digital formats such as WAV files or the generation of MIDI files that allow a user to add the desired instruments or sounds to the image visualization sequences. The sonification unit 118 can provide an enhanced, coherent, musical and animated representation to any visualization sequence.

The sonification unit 118 can generate MIDI audio by accessing a library of audio generation tables generated by the audio generation table unit 120. The audio generation tables allow the user to choose specific notes and sequences of chords and/or scales which are triggered by the musical parameters set in the sonification unit 118 and manipulated by the locations of the image areas of interest data generated by the image area of interest unit 112. WAV files may also be modulated by the sonification unit 118 where the WAV file sounds can be manipulated using audio parameters without the need for the audio generation tables. The sonification unit 118 can combine WAV and/or MP3 and MIDI files in the same visual representation to create a sound unique to the presentation itself. There is no limit to the musical genre or style that can be composed with the sonification unit 118.

Figure 2:
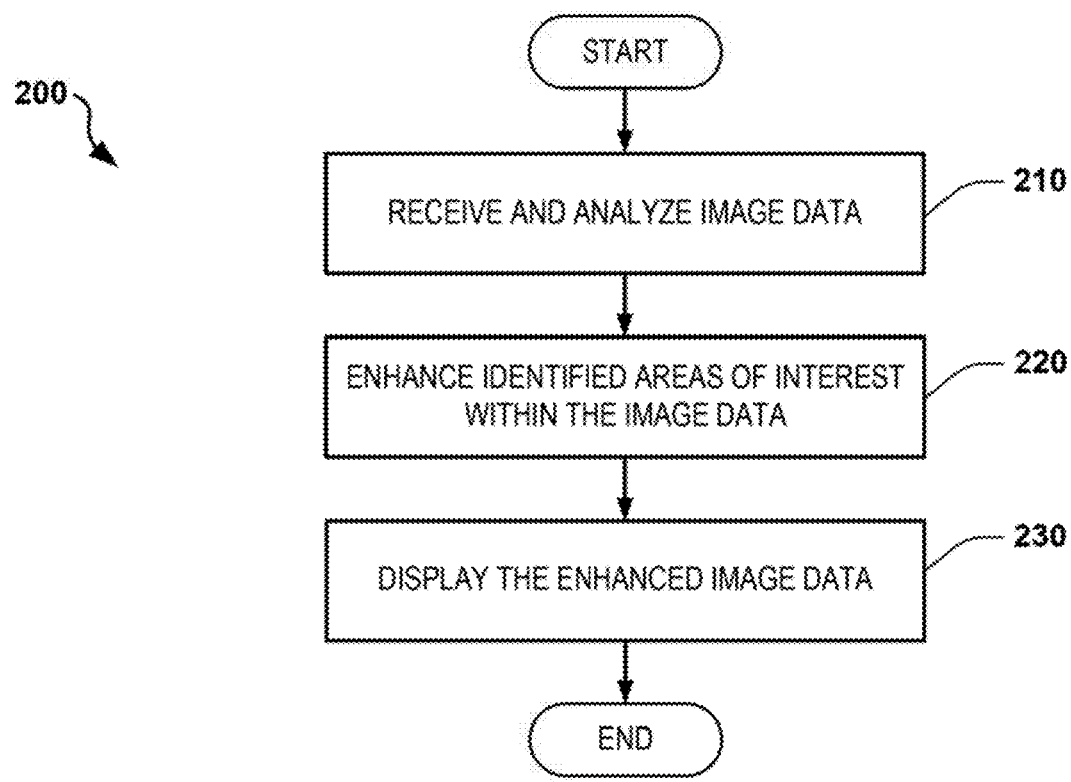
FIG. 2 is a flowchart of a process for enhancing image data associated with areas of interest within a sequence of images.

FIG. 2 is a flowchart of a process 200 for enhancing image data associated with areas of interest within a sequence of images. Referring to FIGS. 1 and 2, in various embodiments, the process 200 may be performed by the processing unit 110 using, for example, the image area of interest unit 112, the image analysis unit 114, the image enhancement unit 116, the image/audio rendering unit 122, the input device 172, the display device 174, the image/audio input/output unit 124 and the memory 180.

At block 210, the processing unit 110, using the image/audio input/output unit 124, receives data representing a plurality of images in a sequence of images. The data representing the images may be stored in a non-volatile memory such as the memory 180. Subsequent to receiving the data representing the plurality of images, the image analysis unit 114 analyzes the plurality images to identify respective three dimensional (3D) locations of one or more areas of interest in the plurality of images. The one or more areas of interest can be chosen by a user by interacting with the image area of interest unit 112 using the input device 172. Alternatively, the image area of interest unit 112 may be configured to automatically identify the areas of interest. The data representing the images may be a plurality of static image file or a video file. The image or video files may be PNG, JPG, AVI, MP4 or other image or video file types.

At block 220, the processing unit 110, using the image enhancement unit 116, visually enhances the one or more of the identified areas of interest in the plurality of the images in the sequence of images. The image enhancement unit 116 may perform one or more of a plurality of enhancement operations. For example, image enhancement unit 116 may visually enhance the one or more of the identified areas of interest by performing at least one of masking, highlighting, magnifying, tracing or motion tracking.

The image enhancement unit 116 may utilize various tools for enhancing the identified areas of interest. The tools may include user interface tools that allow the user to draw numerous geometrical figures with one or more input devices. The geometrical figures can be used to select the areas of interest. The geometrical figures may include corrals, explosions, and motion tracking.

Corrals can be used to highlight certain areas of the plurality of images. There may be different types of corrals. For example, the types of corrals may include a particle corral, a plain color corral, an ink diffusion corral and others. Any type of corral has a user defined polygonal area that is drawn over the image, which defines the corral area. The way in which the different corral types handle the corral area differs from type to type.

A particle corral draws a series of lines across the corral area. The number of lines may be defined by the user by modifying a user interface image referred to as "rake teeth." The lines may be distributed evenly and parallel across a bounding box that encapsulates the corral area at an angle defined by the user by modifying the corral angle. The lines are drawn within the confines of the corral. In the case of an inverted corral area (also referred to as a backdrop), the image is encapsulated in a bounding box, and the lines are only drawn outside of the confines of the corral. For corral position tracking, the particle corral outputs an x, y, z data point that is an average of all the x, y, z points that are being drawn at that particular moment.

The plain color corral draws a series of color fields across the corral area. The number of intervals in the series may be defined by the user by modifying rake teeth. The lines may be distributed evenly and perpendicular across a bounding box that encapsulates the corral area at an angle defined by the user by modifying corral angle. The color fields may be drawn at their respective moment interval. This moment interval can be defined as:

$$\text{moment interval} = \text{event start} + ((\text{event duration}/\text{rake teeth})*\text{interval}) \quad (1)$$

In the case of an inverted corral area, the entire image is encapsulated in a bounding box, and the color fields are drawn around the corral area. For corral position tracking, the plain color corral outputs an x, y, z data point that is an average of all the x, y, z points in the color field that is being drawn at that particular moment.

The ink diffusion corral draws a field of color across the corral area in a manner that mimics a diffusion of ink through a liquid on a surface. The color is 'seeded' in the corral at the area closest to the leading edge of a bounding box that encapsulates the corral area at an angle defined by the user by modifying corral angle. The seeded area is then diffused through the corral. Each pixel reviews neighboring pixels for density, and then takes on a part of that density. The amount of density each pixel takes may be informed by an underlying absorption variability map that creates a more organic appearance to the diffusion. The rate of diffusion can be varied based on the proximity of the periphery of the image resulting in differing rates of movement of the ink corral so that the center may move faster than the periphery. This may be repeated for all pixels until there are no pixels with only partial density left. These diffusion passes may then be distributed evenly across the life of the event, so that the diffusion matches the event length. For corral position tracking, the ink diffusion corral outputs an x, y, z data point that is an average of all the x, y, z points of all semi-opaque pixels in the corral area that is being drawn at that particular moment.

Explosions can be used to animate an area of interest. An explosion is a drawing event in which a group of pixels of an image emit particles with the colors of the pixels of the image for a lifetime (time duration). Explosions may also include specified velocity and rotational rate parameters at which the particles travel. Motion tracking can be used to track the motion of an object in a video sequence of images frame by frame. Explosions may also be assigned beginning and ending colors as well as opacity or degree of opaqueness.

The image enhancement unit 116 may also be able to add one or more extensions to the areas of interest. For example, the image enhancement unit 116 may add a graphic to an area of interest in the form of a tail that follows the area of interest as it moves frame to frame. This feature can be used to accentuate drawing events.

Once one of the various tools is selected, the tool can be used to create a drawing event that can be later adjusted by the user in terms of event duration and location. Multiple drawing events can be stored for a single sequence of images.

Once the image enhancement unit 116 and/or the user has finished visually enhancing the sequence of images at block 220, the processing unit 110, using the image/audio rendering unit 122, communicates the visually enhanced image data to the display device 174 to be displayed (block 230). In addition, the data representing each drawing event, and data representing the 3D locations of the areas of interest, can later be exported in the form of a comprehensive text file to the memory 180 to be utilized by the sonification unit 118 for adding synchronized audio/music to be played as the sequence of images is displayed.

The sequence of images may depict a 3D graph comprising one or more traces, where the areas of interest may comprise different portions of the one or more traces. In the case of a 3D graph, the image enhancement unit 116 may visually enhance the areas of interest by highlighting the different portions of the one or more traces.

Figure 3:
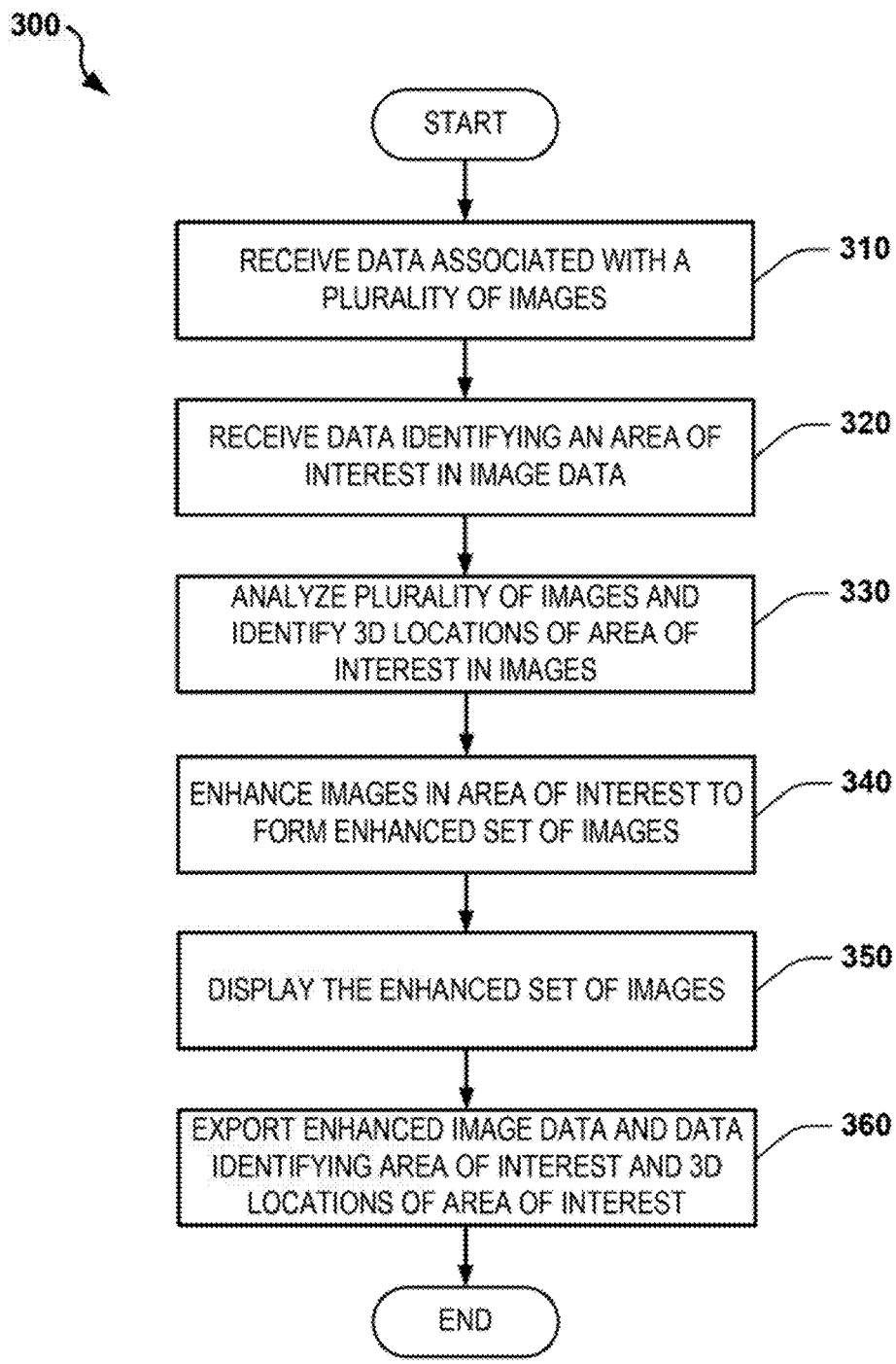
FIG. 3 is a flowchart of another process for enhancing image data associated with areas of interest within a sequence of images.

FIG. 3 is a flowchart of another process 300 for enhancing image data associated with areas of interest within a sequence of images. Referring to FIGS. 1 and 3, in various embodiments, the process 300 may be performed by the processing unit 110 using, for example, the image area of interest unit 112, the image analysis unit 114, the image enhancement unit 116, the image/audio rendering unit 122, the input device 172, the display device 174, the image/audio input/output unit 124 and the memory 180.

At block 310, the processing unit 110, using the image/audio input/output unit 124, receives data representing a plurality of images in a sequence of images. The data representing the images may be stored in a non-volatile memory such as the memory 180. The data representing the images may be a plurality of static images or a video file. The images or video file may be a PNG, JPG, AVI or MP4.

At block 320, the image area of interest unit 112 receives area of interest data from an input device such as the input device 172, the area of interest data identifying an area of interest in one of the plurality of images and the 3D location of the area of interest in the image. One or more areas of interest can be chosen by a user by interacting with the image area of interest unit 112 using the input device 172. The input device can identify the area(s) of interest by drawing a shape around the area of interest. Alternatively to receiving the area of interest data chosen by the user, the image area of interest unit 112 may be configured to automatically identify the area(s) of interest. The area of interest data may identify more than one area of interest in each image and the area of interest data may be omitted from some of the plurality of images.

In one example, at block 330, subsequent to receiving the data representing the plurality of images, and subsequent to receiving the data identify the area(s) of interest, the image analysis unit 114 analyzes the plurality images to identify respective three dimensional (3D) locations of one or more areas of interest in the plurality of images. In this aspect, the image area of interest unit 112 receives the 3D locations from the image analysis unit 114. For example, in cases where the image comprises a graph, the image analysis unit 114 can receive data from a Graph Data Extractor (GDE). The GDE extracts data from graphs and detects the x and y locations of specific color values.

In aspects where the area of interest data is not received for every image in the plurality of images, the image analysis unit 114 may analyze the plurality images to identify respective 3D locations of the identified area of interest in other ones of the plurality of images different than the one of the plurality of images for which the area of interest data was received at block 320. Motion tracking can be used by the image analysis unit 114 to track the motion of an object representing the area of interest in a video sequence of images frame by frame.

At block 340, the processing unit 110, using the image enhancement unit 116, visually enhances the one or more of the identified areas of interest in the plurality of images in the sequence of images. The image enhancement unit 116 may perform one or more of a plurality of enhancement operations. For example, image enhancement unit 116 may visually enhance the one or more of the identified areas of interest by performing at least one of masking, highlighting, magnifying, tracing or motion tracking.

The image enhancement unit 116 may utilize various tools for enhancing the identified areas of interest. The tools may include user interface tools, referred to as selectors, that allow the user to select areas of interest using numerous geometrical figures with one or more input devices. The selectors may include corrals, explosions, and/or geometric shapes such as lines, squares, rectangles, circles, ellipses, triangles, free hand traces, and others. Corrals can be used to highlight certain areas of the plurality of images. Explosions can be used to animate an area of interest. The user interface may allow the user to choose whether or not the selector shape appears on the image when being used.

The image enhancement unit 116 may also be able to add one or more extensions to the areas of interest. For example, the image enhancement unit 116 may add a graphic to an area of interest in the form of a tail that follows the area of interest as it moves frame to frame. This feature can be used to accentuate the drawing events.

The basic selector is a primary graphical element that occupies a 3-dimensional space, with which background image aspects are highlighted. The basic selector may be made up of a static or dynamic array of pixels that may look like images, animated images, color fields, or animated color fields in the case of the ink diffusion corral.

The tail tool is a secondary graphical element that selects an area of interest where a tail is emitted in the course of a primary drawing event. The tail tool is much like the basic selector, except that its behavior is independent from the primary drawing event after emission. The tail has its own lifespan and 3-dimensional velocity as defined by the user.

When a tail or explosion particle is emitted, the initial velocity can be given an initial angular bias relative to the viewer. The angle range tool allows the user to define an angle range to apply to the emitted particle. The angle range is the width of the angular deviation from the angle defined by the initial angular bias. For example, if an explosion emits particles at a 45 degree angle, and the angle range is 0 degrees, then all particles will emit precisely at 45 degree. If the angle range is 10 degrees, the particles would be emitted between 40 and 50 degrees. In addition, a rotational rate tool allows the user to define a rotational rate for tails or explosions. The rotational rate may be applied to tail or explosion particles that are made up of images, and sets the maximum rate of rotational speed an image can have. In addition, a gravity tool allows the user to define an amount of "gravity" that is applied to a particle during motion. The gravity causes the vertical velocity to increase in the negative y direction as a function of time.

A medium density tool allows the user to control the rate at which a particle velocity is muted due to a density of the medium through which the particle is traveling. If a particle is traveling through a medium assigned a density of 0, the particle will not slow down over time. If the particle is traveling through a medium assigned a density of 2, the particle will increasingly slow over time as it travels. An analog of this principle is to shoot a bullet through the air (little medium density), versus water (high medium density). The bullet fired underwater will emerge with the same velocity as that fired in the air, but will slow down incredibly quickly.

Once one of the various tools is selected, the tool can be used to create a drawing event that can be later adjusted by the user in terms of event duration and location. Multiple drawing events can be easily stored for a single sequence of images.

In aspects where the image analysis unit 114 has identified the 3D locations of the area of interest in some of the other images, using object tracking for example, the processing unit 110, using the image enhancement unit 116, visually enhances the identified area of interest in the other ones of the plurality of images using the motion tracked 3D locations for example.

The sequence of images may depict a 3D graph comprising one or more traces, where the areas of interest may comprise different portions of the one or more traces. In the case of a 3D graph, the image enhancement unit 116 may visually enhance the areas of interest by highlighting the different portions of the one or more traces.

At block 350, the processing unit, using the image/audio rendering unit 122, communicates the visually enhanced image data to a display device such as the display device 174 to be displayed. At block 360, the processing unit, using the image/audio input/output unit 124, exports the visually enhanced image data to a memory such as the memory 180. In addition to exporting the visually enhanced image data at block 360, the image/audio input/output unit 124 may also export the data identifying the area of interest and data representing the 3D locations of the area of interest to the memory 180. Data representing each drawing event, and data representing the 3D locations of the areas of interest, can be exported in the form of a comprehensive text file to the memory 180 to be utilized by the sonification unit 118 for adding synchronized audio/music to be played as the sequence of images is displayed.

Figure 4:
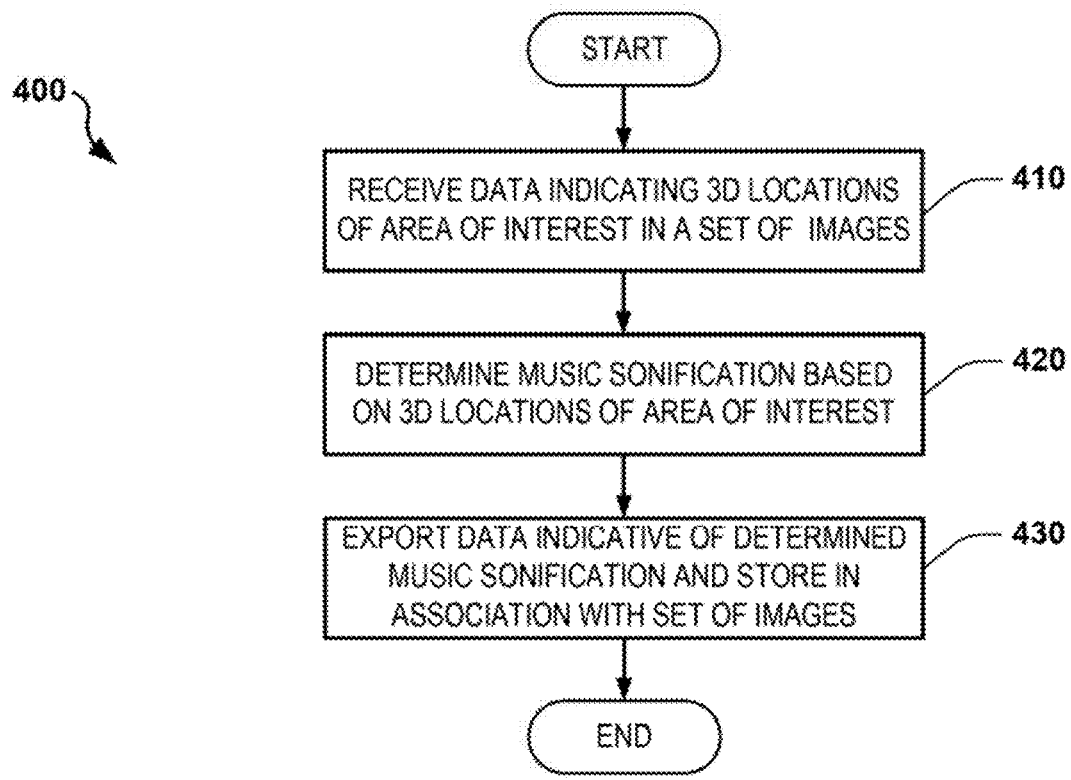
FIG. 4 is a flowchart of a process for generating sonification data for areas of interest in a sequence of images, the sonification data may be rendered simultaneously while rendering the set of images on a display.

FIG. 4 is a flowchart of a process 400 for generating sonification data for areas of interest in a sequence of images, the sonification data to be rendered simultaneously while rendering the set of images on a display. Referring to FIGS. 1 and 4, in various embodiments, the process 400 may be performed by the processing unit 110 using, for example, the sonification unit 118, the audio generation table unit 120, the image/audio rendering unit 122, the image/audio input/output unit 124, the input device 172, the display device 174, the audio device 176 and the memory 180.

At block 410, the processing unit 110, using the image/audio input/output unit 124 receives data indicating three dimensional (3D) locations of one or more areas of interest in a plurality of images in a sequence of images. This area of interest data may have been generated by the image area of interest unit 112 as discussed above in reference to FIGS. 2 and 3. The 3D location data may subsequently have been generated by the image analysis unit 114. The image area of interest unit 112 may have generated the area of interest data based on user input from the input device 172 or, alternatively, may have generated the area of interest data automatically, as discussed above. For example, if the sequence of images depicts a 3D graph comprising one or more traces, the areas of interest may comprise different portions of the one or more traces and the image area of interest unit 112 may choose the different portions of the traces automatically.

At block 420, the processing unit 110, using the sonification unit 118, determines sonification data for the one or more areas of interest in the plurality of images based on the 3D location data received at block 410. Characteristics of the determined sonification data change based on respective first, second and/or third coordinate of the 3D locations of the one or more areas of interest in each of the plurality of images.

The sonification unit 118 may utilize MIDI devices (e.g., a MIDI keyboard) to generate the sonification data at block 420. Alternatively, the sonification unit 118 may modulate a WAV file or MP3 file to generate the sonification data at block 420. Other audio generation methods may also be employed. The sonification unit 118 may use the 3D location data received at block 410 to generate specific notes based on an audio generation table designed to change the specific notes depending on any one or all of the coordinates in the 3D location data. With respect to using WAV or MP3 files, the sonification unit 118 may use one or more of the 3D coordinates to modulate an amplitude and/or frequency of a WAV or MP3 file to generate amplitudes and/or frequencies that change as the 3D location changes from image to image.

In some examples, the sonification data may comprise music. The music can be designed to match a mood of the sequence of images. Everything that moves from image to image in the sequence of images may serve as an area of interest, and the 3D locations are then used to vary the music (e.g., by varying tempo, amplitude, frequency, etc.). An area of interest can be a simulated graphic that moves around the picture from image to image. For example, a graphic of a circle or other geometric shape may be added by the image enhancement unit 116 such that the circle pulses over different portions of each image.

At block 430, the processing unit 110, using the image/audio input/output unit 124 exports data indicative of the determined sonification data to be stored in a memory in association with the set of images. The exported data indicative of the determined sonification data may be stored, for example, in the memory 180.

Figure 5:
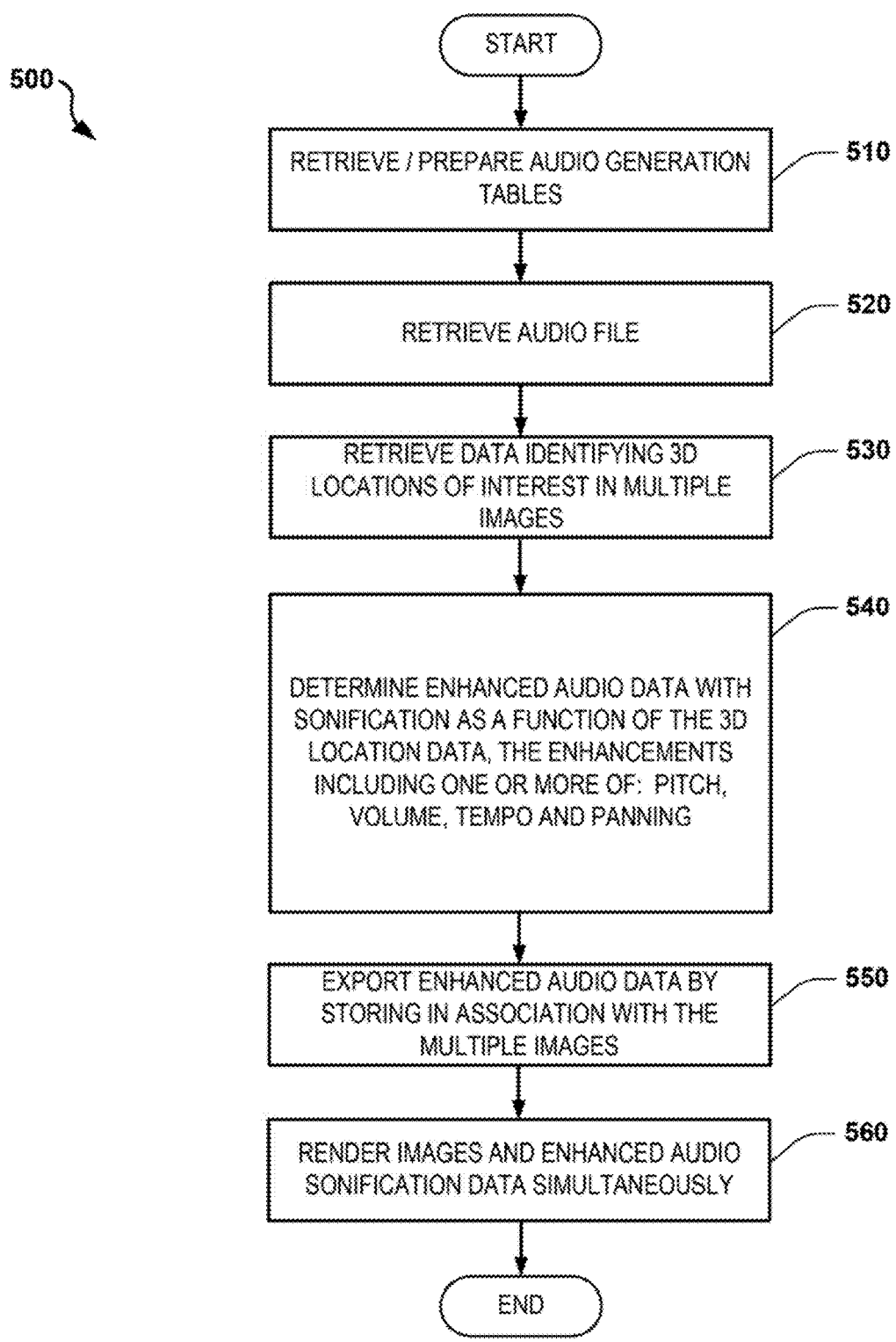
FIG. 5 is a flowchart of another process for generating sonification data for areas of interest in a sequence of images, the sonification data may be rendered simultaneously while rendering the set of images on a display.

FIG. 5 is a flowchart of a process 500 for generating sonification data for areas of interest in a sequence of images, the sonification data to be rendered simultaneously while rendering the set of images on a display. Referring to FIGS. 1 and 5, in various embodiments, the process 500 may be performed by the processing unit 110 using, for example, the sonification unit 118, the audio generation table unit 120, the image/audio rendering unit 122, the image/audio input/output unit 124, the input device 172, the display device 174, the audio device 176 and the memory 180.

At block 510, the processing unit 110, using the audio generation table unit 120, retrieves and/or prepares at least one audio generation table, the audio generation table defining characteristics of audio associated with at least one of the respective first, second and third coordinates of the one or more areas of interest in each of the plurality of images. If audio generation tables are already prepared, they may be retrieved from the memory 180 or other memory storing the prepared tables. If audio generation tables have not been prepared, the audio generation table unit 120 may receive input parameters defining one or more audio generation tables from a user. The input parameters may be received from the input device 172, for example.

In one example, the characteristics defined by the at least one audio generation table comprise a plurality of musical notes associated with a plurality of positions in the at least one of the respective first, second and third coordinates such that the determined sonification data includes different ones of the plurality of musical notes when the one or more areas of interest are located at different ones of the plurality of positions.

In another example, the characteristics defined by the at least one audio generation table retrieved and/or prepared at block 510 comprise at least one of volume levels and tempos associated with a plurality of positions in the at least one of the respective first, second and third coordinates such that the determined sonification data includes at least one of different tempos and different volumes when the one or more areas of interest are located at different ones of the plurality of positions.

Table 1 shows an example of an audio generation table that may be used by the sonification unit 118 to generate different music notes when an area of interest is located at different coordinates along one of the three coordinate axes in the image (e.g., one of X, Y or Z axes). Different note-tables similar to Table 1 may be generated for different axes. These notes may be notes to be generated by a MIDI player and to produce a MIDI file to be played simultaneously while displaying the associated enhanced video, for example.

In Table 1, C1 represents the minimum value of a normalized location along one of three coordinate axes in the 3D location data. The location data generated by the image analysis unit 114, in this aspect, is normalized on a scale from zero to one. C2 represents the maximum value of the normalized location. C3 represents the note to be played if the normalized location falls within the corresponding range. In the note-table of Table 1, a "C" will be played if an area of interest is located in a location between 0 and 0.33 along the associated coordinate axis, an "E" will be played if the area of interest is located between 0.33 and 0.66, and a "G" will be played if the area of interest is located between 0.66 and 1.0.

TABLE 1

| C1 (Minimum) | C2 (Maximum) | C3 (Note) |
| --- | --- | --- |
| 0 | .33 | C |
| .33 | .66 | E |
| .66 | 1 | G |

Table 2 shows an example of an audio generation table that may be used by the sonification unit 118 to generate different chords comprising multiple notes when an area of interest is located at different coordinates along one of the three coordinate axes in the image (e.g., one of X, Y or Z axes). Different chord-tables similar to Table 2 may be generated for different axes. These chords may be chords to be generated by a MIDI player and to produce a MIDI file to be played simultaneously while displaying the associated enhanced video, for example.

In the chord-table of Table 2, a chord including notes "C", "E" and "G" will be played if an area of interest is located in a location between 0 and 0.33 along the associated coordinate axis, a chord including "E", "B" and "G" will be played if the area of interest is located between 0.33 and 0.66, and a chord including "D", "F" and "A" will be played if the area of interest is located between 0.66 and 1.0.

TABLE 2

| C1 (Minimum) | C2 (Maximum) | C3 (Note) | C4 (Note) | C5 (Note) |
| --- | --- | --- | --- | --- |
| 0 | .33 | C | E | G |
| .33 | .66 | E | B | G |
| .66 | 1 | D | F | A |

Table 3 shows an example of an audio generation table that may be used by the sonification unit 118 to generate a different frequency, e.g., number of notes (e.g., MIDI notes in this example) per second, when an area of interest is located at different coordinates along one of the three coordinate axes in the image (e.g., one of X, Y or Z axes). Different frequency-tables similar to Table 3 may be generated for different axes.

TABLE 3

| C1 (Minimum) | C2 (Maximum) | C3 (Notes per sec.) |
| --- | --- | --- |
| 0 | .33 | 2 |
| .33 | .66 | 4 |
| .66 | 1 | 8 |

The "C3" column of Table 3 allows a user to specify a number of MIDI notes per second. Based on the values in column C3 of Table 3, a new note will be generated every 0.5 seconds (2 notes per second) if an area of interest is located in a location between 0 and 0.33 along the associated coordinate axis, a new note will be generated every 0.25 seconds (4 notes per second) if an area of interest is located in a location between 0.33 and 0.66, and a new note will be generated every 0.125 seconds (8 notes per second) if an area of interest is located in a location between 0.66 and 1.0.

A user can also define the tempo of the midi generated by data by specifying a beats per minute (BPM) variable, which is determined by how often the data is sampled in milliseconds. Setting the BPM variable to 60 results in sampling the MIDI data every 1000 milliseconds (1 second) results in a tempo of 60 BPM. At 60 BPM each midi note is one second long or 1000 milliseconds in duration. To achieve a faster tempo setting, the BPM variable can be increased and to achieve a slower temp setting, the BPM variable can be decreased. For example, setting the BPM variable to 90 results in sampling the data every 667 milliseconds resulting in each MIDI note lasting 0.667 seconds. Setting the BPM variable results in the MIDI notes being of equal duration. These notes of equal length can be equated in musical terms to quarter notes, for example.

A user can also define a rhythm at which the MIDI notes are played. Rhythm can be created by generating a repeating pattern of notes of various lengths or selectively silencing or muting notes (known as a rest in musical terminology).

For example, a quarter note can be divided into two equal notes which are known as 8th notes which can be further divided into two equal notes which are known as 16th notes. Four 16th notes equal the same amount of time as one quarter note.

Table 4 is a rhythm generation table that allows a user to specify many rhythmical patterns by representing common musical note values with numerical values. In this embodiment, the number 4 equals a quarter note, the number 8 equals an 8th note, and the number 16 equals a 16th note. To signify this rhythm the table would read from top to bottom.

TABLE 4

| Note Rhythm |
| --- |
| 8 (⅛ note) |
| 8 |
| 4 (¼ note) |
| 16 (1/16 note) |
| 16 |
| 16 |
| 16 |

The rhythm pattern in Table 4 would continue to repeat until the musical event concludes. The rhythm pattern that Table 4 produces depends on the tempo or BPM value that the user defines resulting in note values having varying durations of time, depending on the specified BPM.

Table 5 shows the length of time of MIDI notes that the rhythm pattern of Table 4 would result in for three different BPM variable tempo values.

TABLE 5

| Note Rhythm | 60 BPM | 90 BPM | 127 BPM |
| --- | --- | --- | --- |
| 4 (quarter note) | 1000 ms | 667 ms | 472 ms |
| 8 (eighth note) | 500 ms | 333 ms | 236 ms |
| 8 | 500 ms | 333 ms | 236 ms |
| 4 | 1000 ms | 667 ms | 472 ms |
| 16 (sixteenth note) | 250 ms | 167 ms | 118 ms |
| 16 | 250 ms | 167 ms | 118 ms |

TABLE 5-continued

| Note Rhythm | 60 BPM | 90 BPM | 127 BPM |
| --- | --- | --- | --- |
| 16 | 250 ms | 167 ms | 118 ms |
| 16 | 250 ms | 167 ms | 118 ms |

In addition to setting note lengths to ¼, ⅛ and 1/16 using Table 4, a user can also specify a period of silence (equivalent to a rest in music) by setting the Note Rhythm value to other values. For example, if the fourth Note Rhythm variable in Table 4 were changed to a 3, the fourth note could be a silent period equal in length to a quarter note. Table 6 illustrates an example of the resulting note lengths that could be rendered at a BPM value of 60 including a quarter note silent period following the third note.

TABLE 6

| Note Rhythm (length) |
| --- |
| 4 - 1000 ms |
| 8 - 500 ms |
| 8 - 500 ms |
| 3 - 1000 ms (silence) |
| 16 - 250 ms |
| 16 - 250 ms |
| 16 - 250 ms |
| 16 - 250 ms |

Other Note Rhythm variable values can also be programmed. Table 7 illustrates an example of possible Note Rhythm variable values from 1 to 16 and the resulting note length or silent period length. These are exemplary only and other Note Rhythm values, note lengths, and silent period lengths can be used. In Table 7, a variable "Q" is used to designate a length of time of a quarter note.

TABLE 7

| Note Rhythm |
| --- |
| 1 = Q × 4 = Whole note |
| 2 = Q × 2 = Halfnote |
| 3 = Q + S = Quarter note rest |
| 3 - 1000 ms (silence) |
| 4 = Q × 1 = Quarter note |
| 5 = Q × .6666666 + S = Quarter note triplet rest |
| 6 = Q × .6666666 = Quarter note triplet |
| 7 = Q × .5 + S = 8th note rest |
| 8 = Q × .5 = 8th note |
| 9 = Q × .75 = Dotted 8th note |
| 10 = Q × 1.5 = Dotted quarter note |
| 11 = Q × .3333333 + S = 8th Note triplet rest |
| 12 = Q × .3333333 = 8th note triplet |
| 13 = Q × 2 + S = Half note rest |
| 14 = Q × 3 = Dotted half note |
| 15 = Q × .25 + S = 16th note rest |
| 16 = Q × .25 = 16th note |

Tables 1-2 are referred to as note-generation tables and Table 3 is referred to as a notes-per-second table. Different combinations of note-generation Tables 1-2 and notes per second Table 3 may be associated with different drawing events in a sequence of images. A user may utilize script files to combine different note-generation Tables 1-2 and different notes per second Table 3 with different drawing events. In addition, the BPM variable and Note Rhythm variable tables, as illustrated in Tables 4-7 can be used to change the rhythm of notes (note length) and add silent periods. In addition the script files may also be utilized to manipulate the volume and panning of notes for the different drawing events.

Table 8 shows an example of a script file that may be generated by the audio generation table unit 120 based on user input receive from the input device 172. A user can generate multiple script files for multiple drawing events in an image sequence, where each script file may combine different note generations tables (Tables 1-2) with different tempo tables (Table 3).

TABLE 8

| Index | Var. Name | Values | Description |
|---|---|---|---|
| 1 | Event | 1 to n | Event number |
| 2 | NoteMod | x/y/z | Axis controlling the pitch modulation in the note- table (Tables 1, 2 and/or 3) |
| 3 | FlipNte | y/n | Invert or not invert location values of pitch axis |
| 4 | AmpMod | x/y/z | Axis controlling the volume |
| 5 | FlipAmp | y/n | Invert or not invert location values of volume axis |
| 6 | TempMod | x/y/z | X, Y, Z Axis controlling the tempo in beats per minute (BPM) |
| 7 | FlipTpo | y/n | Invert or not invert location values of tempo axis |
| 8 | Pan | x/y/z/1 | Axis controlling the pan (1 is no pan) |
| 9 | FlipPan | y/n | Invert or not invert location values of pan axis |
| 10 | Channel | 1-16 | MIDI channel No. |
| 11 | Track | 1-16 | MIDI track No. |
| 12 | Tempo | "Beats/mm (BPM)" | Specified BPM to be used in conjunction with the drawing event |
| 13 | MidTabScript | "Name" | Name(s) and order of note-generation tables to use |
| 14 | Duration | Sec. | Duration (in sec.) that each note generation table is used |
| 15 | Rhythm | "Name". | Name of rhythm table file containing sampling rates to use for the drawing event |

The different rows of Table 8 are explained here:
Row 1 of the script file of Table 8 lists the drawing event number that will provide the location data to trigger the specified audio parameters defined by the parameters in the other rows of the Table 8 script file.
Row 2 defines which of three axes (X, Y, or Z in this example) will control pitch modulation of the note(s) assigned to the drawing event using the note-generation tables.
Row 3 gives the user an option to invert the axis (y=invert, n=no invert) controlling the pitch or to keep the standard maximum and minimum points of the designated axis (X, Y or Z). Inverting the axis makes the normal maximum point the minimum point and makes the normal minimum point the maximum point.
Row 4 defines which axis (X, Y, or Z) will control the volume of the note generation note(s) and chords.
Row 5 gives the user an option to invert the axis (y=invert, n=no invert) designated in 4th column with a 'y' or 'n'.
Row 6 defines the axis (X, Y, or Z) that controls the tempo.
Row 7 gives the user an option to invert the axis (y=invert, n=no invert) designated in the 6th column as controlling the tempo.
Row 8 defines which axis (X, Y, or Z) controls panning or the option to keep a balanced distribution of music by placing a 1 in the row. Panning involves a shifting of sound from one speaker to another so as to create stereo sounds. For example, panning may allow for the migration of sound from the left channel to the right channel and vice versa.
Row 9 gives the user an option to invert the axis (y=invert, n=no invert) that controls panning as designated in Row 8.
Rows 10 and 11 define the audio channel and tracks (e.g., MIDI channel and MIDI track) respectively, to user for the specified drawing event. In this example, channel numbers 1-16 are used in the 10th and 11th columns which correspond to a maximum of 16 different MIDI channels and tracks that can be used for all the drawing events.
Row 12 identifies a name of a file containing values of BPM variable(s) to use during the specified drawing event.
Row 13 lists names of multiple note-generation tables to be used to generate sonification for the drawing event.
Row 14 lists a duration, in seconds, that each of the note-generation tables listed in Row 13 is used. The order of times listed in Row 14 correspond with the order of the note-generation tables listed in Row 13.
Row 15 identifies a name of a file containing changing sampling rates to use during the specified drawing event.

In addition to being able to modulate notes (e.g., MIDI notes) based on the locations of the areas of interest, the sonification unit 118 can modulate volume (amplitude) or frequency (pitch) and other parameters of one or more existing audio files (e.g., WAV, MP3, etc.). Table 9 shows an example of a script file that may be generated by the audio generation table unit 120 based on user input receive from the input device 172. The parameters in Table 6 determine what portions of the audio file to user for various drawing events as well as how to use the location data to modulate the audio files.

TABLE 9

| Index | Var. Name | Values | Description |
|---|---|---|---|
| 1 | Event | 1 to n | Event number |
| 2 | AmpMod | x/y/z | Axis controlling the volume |
| 3 | FlipMod | y/n | Invert or not invert location values of volume axis |
| 4 | FreqMod | x/y/z | Axis controlling the frequency modulation |
| 5 | FlipFreq | y/n | Invert or not invert location values of freq. axis |
| 6 | Start | time | Starting point in music file to modulate (sec.) |
| 7 | End | time | Ending point in music file to modulate (sec.) |
| 8 | Pan | x/y/z/1 | Axis controlling the pan (1 is no pan) |
| 9 | FlipPan | y/n | Invert or not invert location values of pan axis |
| 10 | FWin | time | An amount of time provided at an end of a pop event used to remove "pop" at the end of the event |
| 11 | BWin | time | An amount of time provided at a beginning of an event used to remove "pop" at the beginning of the event |
| 12 | Slope | y/n | Slope accentuated or not |
| 13 | RLeft | 0 to 1.0 | Percent attenuation of left speaker |
| 14 | RRight | 0 to 1.0 | Percent attenuation of right speaker |
| 15 | FQuiet | time | Time (sec.) to silence at beginning of event. |
| 16 | BQuiet | time | Time (sec.) to silence at end of event. |
| 17 | AudioFile | Name | Name of music WAV, MP3 or other format of audio file to be modulated. |

The different rows of Table 9 are explained here:
Row 1 lists the drawing event number that will modulate the assigned audio file.
Row 2 defines which axis (X, Y, or Z) will modulate the amplitude (volume) of the audio file.
Row 3 gives the user an option to invert the axis (y=invert, n=no invert) that controls amplitude.

Row 4 defines the axis (X, Y or Z) that controls the modulation of the frequency of the audio file.

Row 5 gives the user an option to invert the axis controlling the frequency (y=invert, n=no invert).

Rows 6 and 7 define start and end times, respectively, of the portion of the audio file that will be modulated.

Row 8 gives the user an option to designate the axis (X, Y, or Z) that will control panning or the option to keep a balanced distribution of music by placing a 1 in the column.

Row 9 gives the user an option to invert the axis controlling the panning (y=invert, n=no invert).

Row 10 gives the user an option to designate the start of a time frame (in seconds) that will remove a pop if it appears in beginning of the drawing event.

Row 11 gives the user an option to designate the end of a time frame (in seconds) that will remove a pop if it appears in the end of the drawing.

Row 12 gives the user an option to accentuate the slope of a nonlinear drawing event (y=accentuate, n=no accentuate). Accentuate a slope of a nonlinear drawing event may include calculating an original trend line of the nonlinear event and giving the slope a value of 1, for example.

Rows 13 and 14 define the attenuation of left and right speakers, respectively. A value of 1 will have no attenuation while a value of 0 will have full attenuation.

Rows 15 and 16 set a duration for creating a period of silence, respectively, at the beginning or the end of the drawing event.

Row 17 lists the name of the audio file that will be modulated.

At block 520, the processing unit 110, using the image/audio input/output unit 124, retrieves an audio file comprising a stream of audio. The audio file may be any form of audio including, but not limited to music, single notes, chords, sounds of nature, speech and others. The audio file may be a MIDI file, a WAV file, a MP3 file or other type of file.

At block 530, the processing unit 110 receives/retrieves data indicating 3D locations of one or more areas of interest in a plurality of images in a sequence of images. The 3D location data may have been generated using one of the processes 200 or 300 described above in reference to FIGS. 2 and 3. The plurality of images in the sequence of images may have been enhanced using the image enhancement unit 116 when performing one of the processes 200 or 300. The 3D location data may be in any type of 3D coordinate systems including, but not limited to Cartesian, spherical, cylindrical, or other.

At block 540, the processing unit 110, using the sonification unit 118 determines sonification data for the one or more areas of interest in the plurality of images based on the 3D locations. The characteristic of the determined sonification data change based on respective first, second and third coordinates of the 3D locations of the one or more areas of interest in each of the plurality of images.

The characteristics of the determined sonification data are determined by the parameters in the at least one audio generation table, such as the audio generation tables illustrated in Tables 1-6, retrieved and/or prepared at block 510. The characteristics of the determined sonification data may comprise one or more modulation actions associated with the plurality of positions in the at least one of the respective first, second and third coordinates. The determined sonification data includes differently modulated portions of one or more streams of audio in the retrieved audio file when the one or more areas of interest are located at different ones of the plurality of positions as determined by the 3D location data. The one or more modulation actions used to modulate the audio file may include at least one of volume modulation and frequency modulation. The modulation actions may also include tempo modulation and panning.

At block 550, the processing unit 110, using the image/audio input/output unit 124, exports data indicative of the determined sonification data to be stored in a memory in association with the set of images. The enhanced audio data of the determined sonification data can be stored in the memory 180 or other memory.

At block 560, the processing unit, using the image/audio rendering unit 116, renders the plurality of images on a display device and simultaneously renders the sonification data on an audio device. The plurality of enhanced images may be rendered on the display device 174 and the enhanced audio may be rendered on the audio device 176.

The processes 200, 300, 400 and 500, respectively, may be embodied on a non-transitory computer readable medium, for example, but not limited to, the memory 180 or other non-transitory computer readable medium known to those of skill in the art, having stored therein a program including computer executable instructions for making a processor, computer, or other programmable device execute the operations of the processes.

Figure 6:
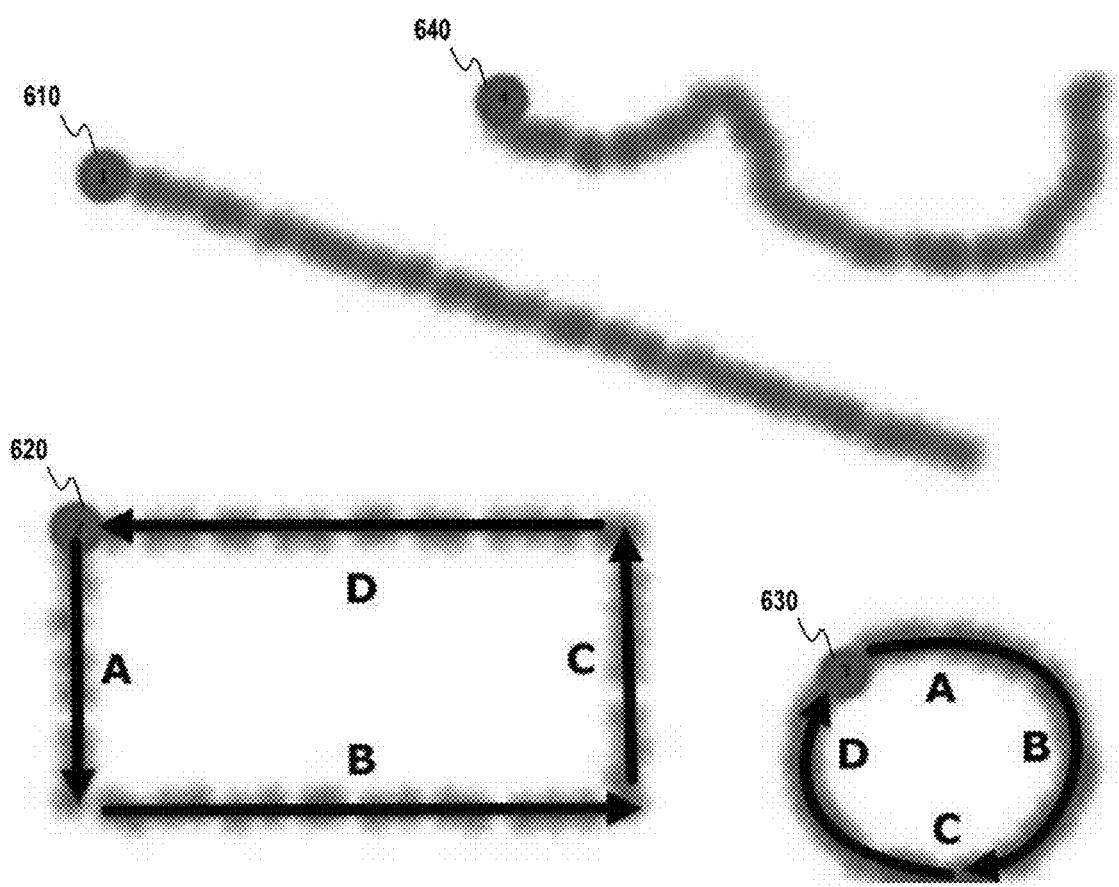
FIG. 6 illustrates examples of different types of drawing tools that may be used to identify areas of interest in images to be processed by the processes of FIGS. 2-5.

FIG. 6 illustrates examples of different types of drawing tools that may be used to identify areas of interest in images to be processed by the processes 200, 300, 400 and 500 of FIGS. 2-5. The examples in FIG. 6 are two dimensional, but those skilled in the art will recognized that graphical display systems can extend similar drawing tools to three dimensions to generate 3D location data for areas of interest in a sequence of images as described above. Drawing tool 610 is an example of a straight line drawing tool. Drawing tool 620 is an example of a rectangle drawing tool where the location proceeds along left side A, across bottom line B, up right side C and finally along top line D. Drawing tool 630 is an example of a circle drawing tool where the location proceeds along portions A, B, C and D of the circle in a clockwise fashion. Drawing tool 640 is an example of a freehand drawing tool which can take any shape the user desires. Other types of drawing tools could also be used.

FIGS. 7-14 are graphical depictions illustrating examples of sonification data generated by processes described herein based on different examples of locations of areas of interest in a sequence of images.

Figure 7:
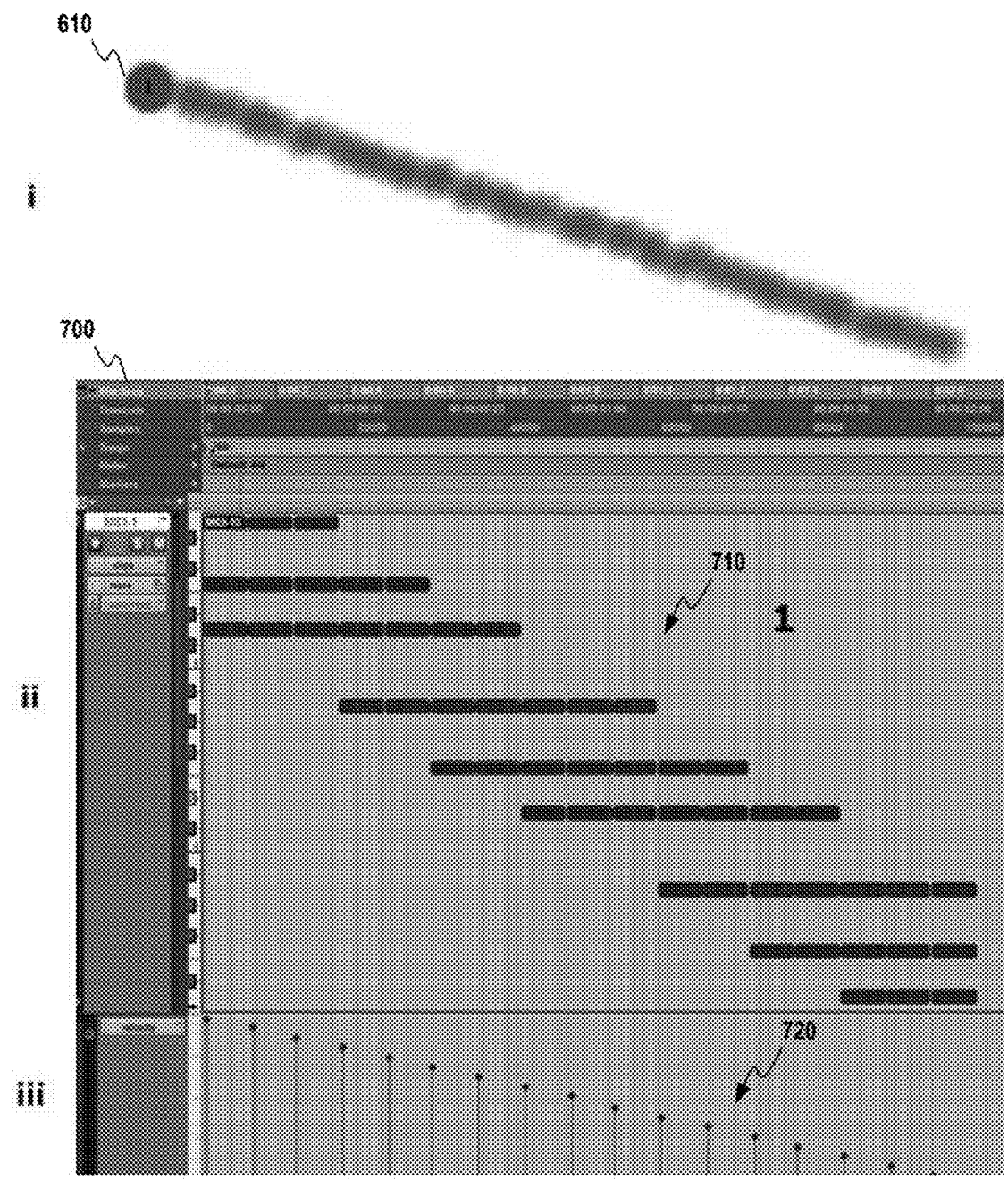
FIGS. 7-14 are graphical depictions illustrating examples of sonification data generated by processes described herein based on different examples of locations of areas of interest in a sequence of images.

Referring to FIG. 7, a display 700 illustrates notes 710 and volume levels 720 resulting from modulation of notes and volume based on the area of interest locations as determined using the line drawing tool 610. In this example, Y axis data was used to modulate both the notes and the volume levels. The notes are at higher frequencies when the Y coordinate is at its maximum level, which is at the top of the display in this example, and at lower frequencies as the Y location moves to its minimum level at the far right of the line generated by the line drawing tool 610. The volume levels are at a maximum level when the Y coordinate is at its maximum level and at progressively lower levels as the Y location moves to its minimum level.

Figure 8:
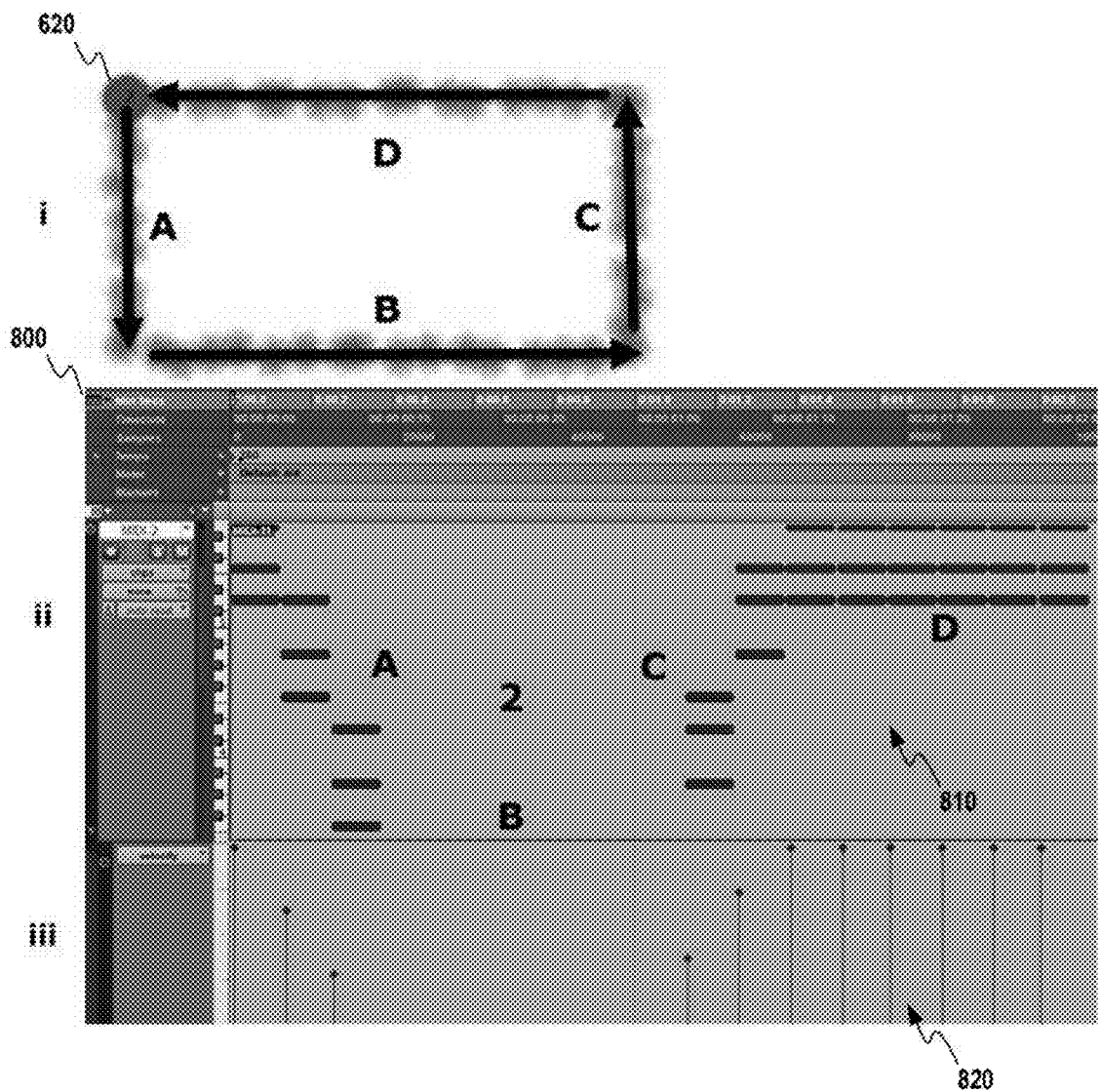

Referring to FIG. 8, a display 800 illustrates notes 810 and volume levels 820 resulting from modulation of notes and volume based on the area of interest locations as determined using the rectangle drawing tool 620. In this example, Y axis data was used to modulate both the notes and the volume levels. The notes are at higher frequencies when the Y coordinate is at higher levels and at progressively lower levels as the Y location moves lower. The volume levels are at a maximum level when the Y coordinate is at its maximum level and at progressively lower levels as the Y location moves to its minimum level.

As shown in the display 800, the notes 810 at a highest frequency at the starting point in the upper left corner of the drawing tool 620, move to a minimum frequency as the drawing tool 620 proceeds along vertical line A, stays at the minimum frequency moving along horizontal line B, move back to the maximum frequency moving along vertical line C and remain at a maximum frequency moving along horizontal line D. Similarly, the volume levels 820 at a highest level at the starting point in the upper left corner of the drawing tool 620, move to a minimum level as the drawing tool 620 proceeds along vertical line A, stays at the minimum level moving along horizontal line B, move back to the maximum level moving along vertical line C and remain at a maximum level moving along horizontal line D.

Figure 9:
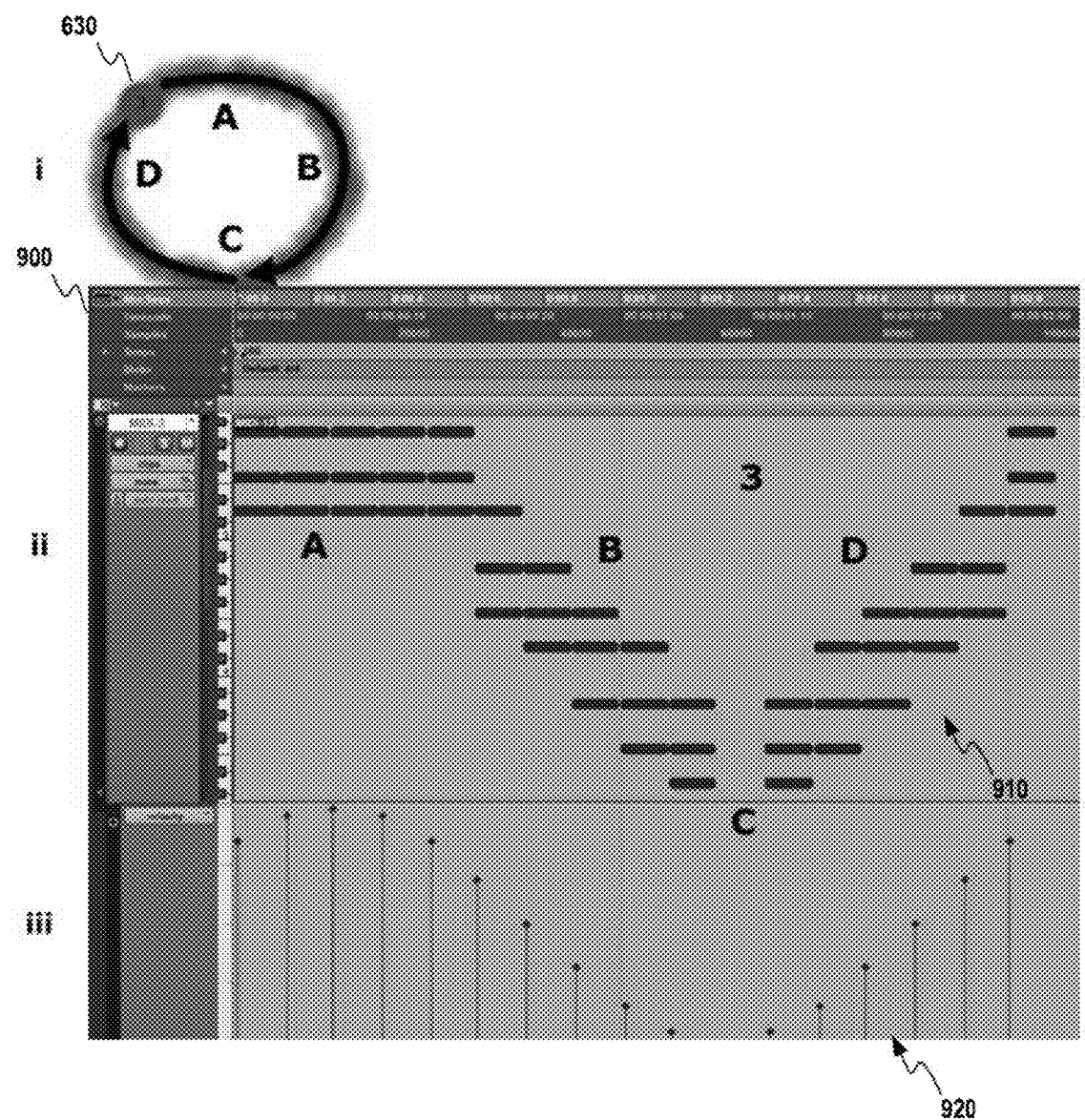

Referring to FIG. 9, a display 900 illustrates notes 910 and volume levels 920 resulting from modulation of notes and volume based on the area of interest locations as determined using the circle drawing tool 630. In this example, Y axis data was used to modulate both the notes and the volume levels. The notes are at higher frequencies when the Y coordinate is at higher levels and at progressively lower levels as the Y location moves lower. The volume levels are at a maximum level when the Y coordinate is at its maximum level and at progressively lower levels as the Y location moves to its minimum level.

As shown in the display 900, the notes 910 are at a highest frequency at the starting point near the top of the drawing tool 630, move to progressively lower frequency as the drawing tool 630 proceeds along the circumference from point A to point B, reaching the minimum frequency at point C, getting higher moving from point C to point D, reaching the maximum frequency at point D. Similarly, the volume levels 920 are at a highest level at the starting point, move to progressively lower levels as the drawing tool 630 proceeds along the circumference from point A to point B, reaching the minimum level at point C, getting higher moving to point D and reaching the maximum level at point D.

Figure 10:
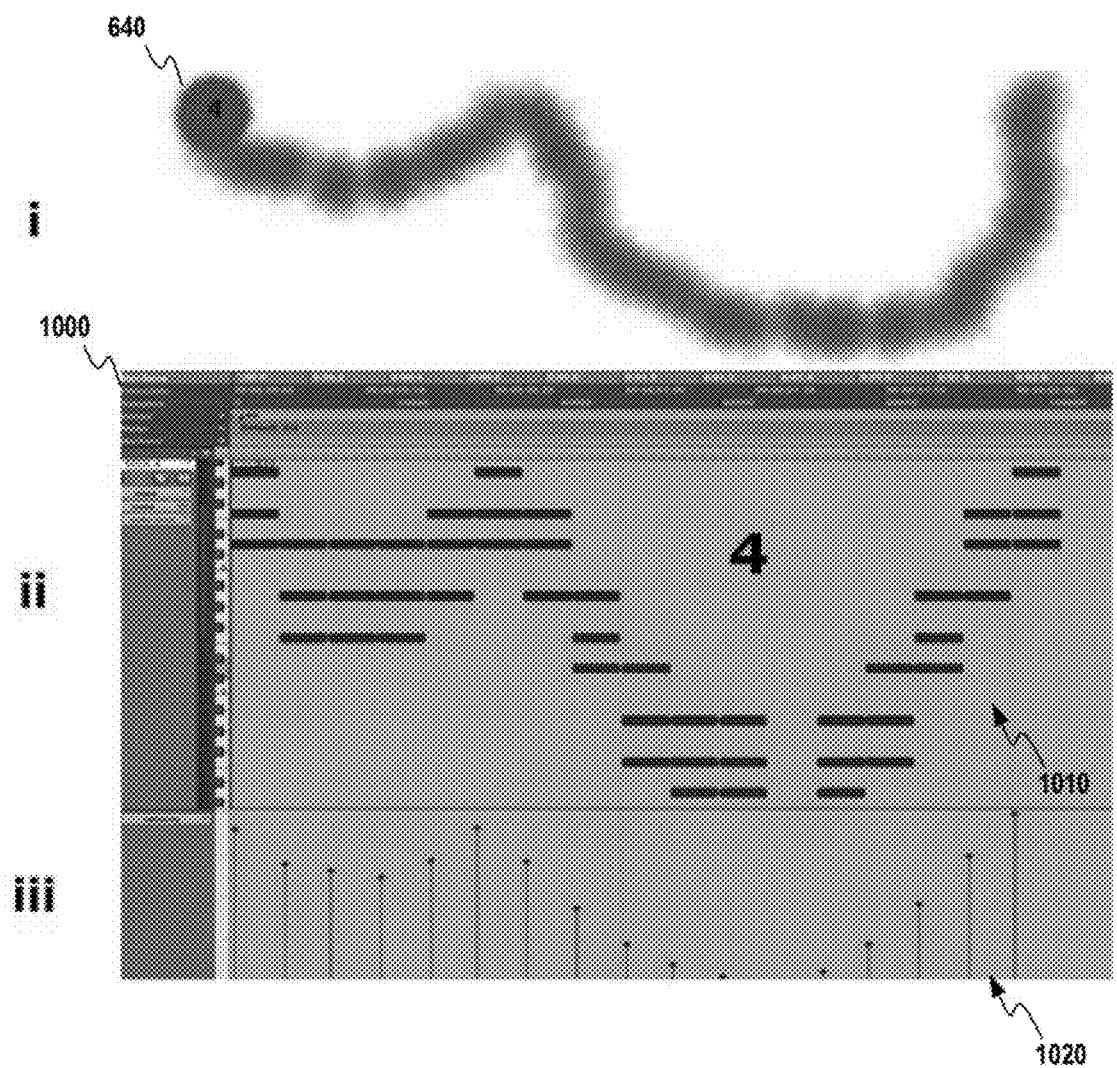

Referring to FIG. 10, a display 1000 illustrates notes 1010 and volume levels 1020 resulting from modulation of notes and volume based on the area of interest locations as determined using the freehand drawing tool 640. In this example, Y axis data was used to modulate both the notes and the volume levels. The notes are at higher frequencies when the Y coordinate is at higher levels and at progressively lower levels as the Y location moves lower. The volume levels are at a maximum level when the Y coordinate is at its maximum level and at progressively lower levels as the Y location moves to its minimum level.

As shown in the display 1000, the notes 1010 are at a highest frequency at the starting point, move to a medium frequency and back to the maximum frequency as the drawing tool 640 moves down to a medium Y location and back to the maximum Y location, and moves to a minimum frequency and back to the maximum frequency as the drawing tool 640 moves down to a minimum Y location and back to the maximum Y location. The volume levels 1020 are at a highest level at the starting point, move to a medium level and back to the maximum level as the drawing tool 640 moves down to a medium Y location and back to the maximum Y location, and moves to a minimum level and back to the maximum level as the drawing tool 640 moves down to a minimum Y location and back to the maximum Y location.

Figure 11:
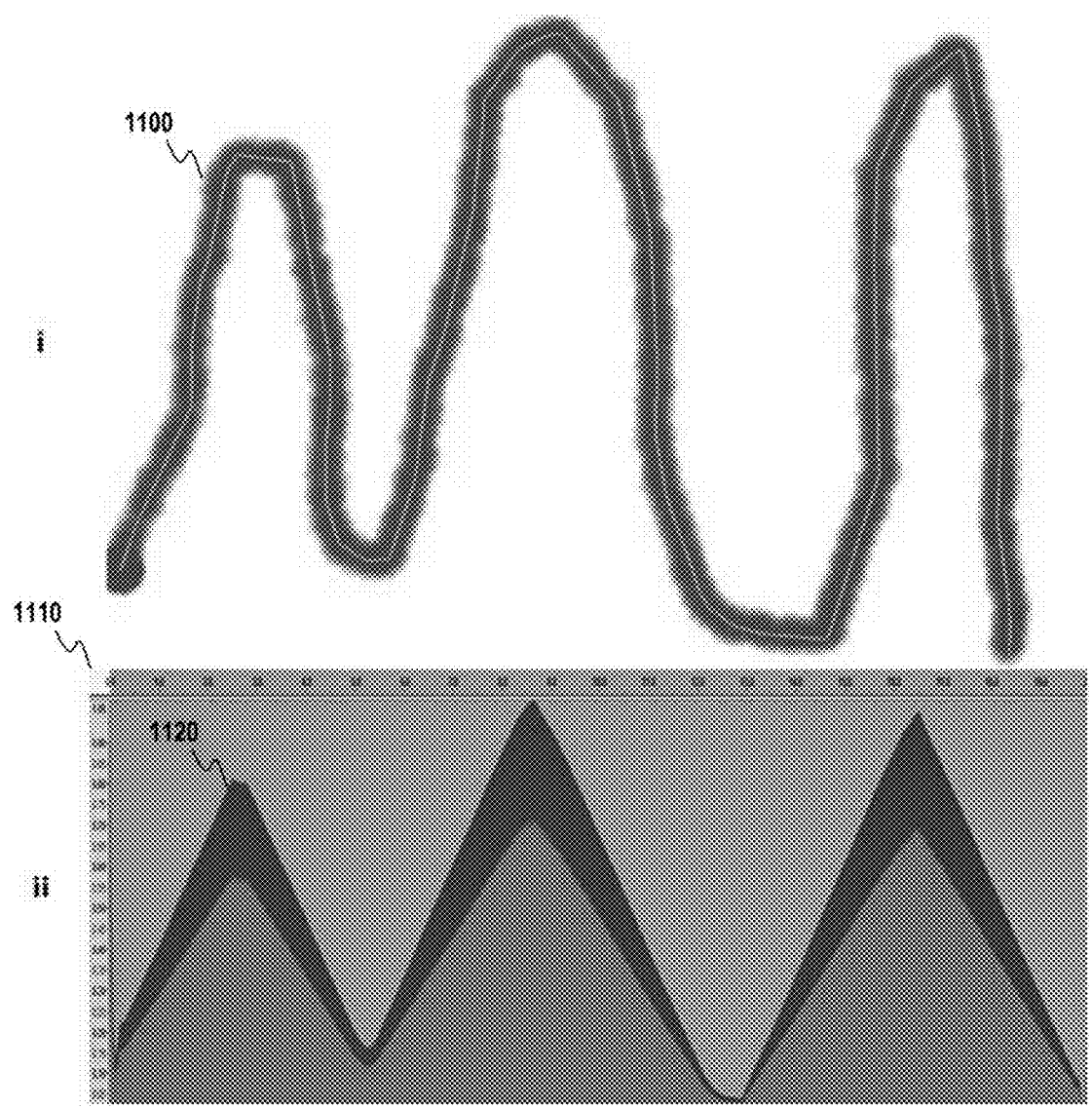

Referring to FIG. 11, a display 1110 illustrates volume levels 1120 resulting from modulation of notes and volume based on the area of interest locations as determined using a freehand drawing tool 1100. In this example, Y axis data was used to modulate the volume levels of a WAV file. The volume levels are at a maximum level when the Y coordinate is at its maximum level and at progressively lower levels as the Y location moves to its minimum level.

As shown in the display 1100, the volume levels 1120 start at a low level at the starting point to the far left of the drawing tool 1100 where the Y location is near its minimum. As the location of the drawing tool 1100 moves from left to right, the volume increases to a first high level, down to a low level, up to a second high level, down to a lowest level, up to a third high level and finally down to a lowest level.

Figure 12:
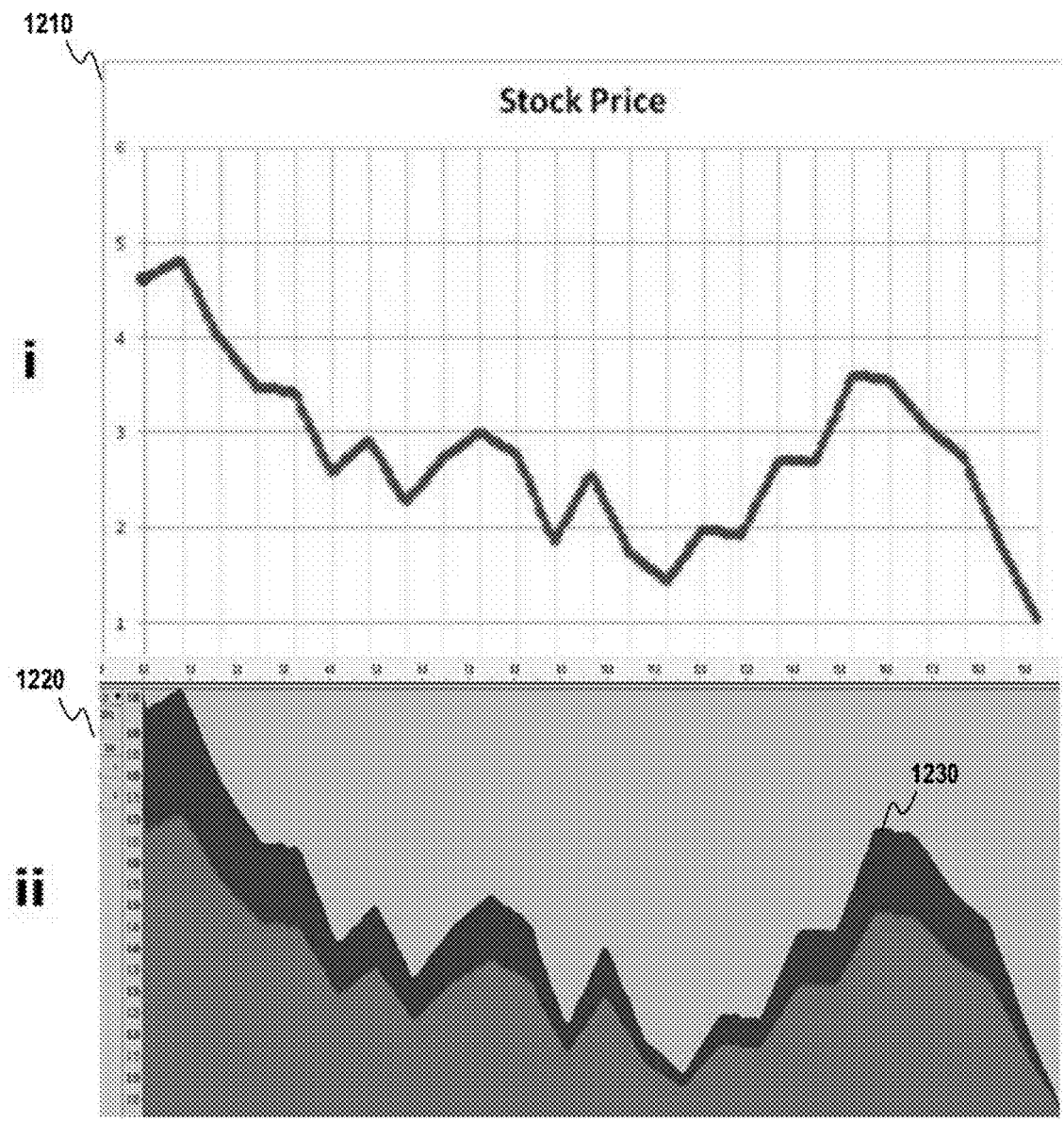

Referring to FIG. 12, a display 1220 illustrates volume levels 1230 resulting from modulation of notes and volume based on the area of interest locations as determined using graph 1210 of a time history of a stock price. In this example, Y axis data was used to modulate the volume levels of a WAV file. The volume levels are at a maximum level when the Y coordinate is at its maximum level and at progressively lower levels as the Y location moves to its minimum level. As shown in the display 1220, the volume levels 1230 move up when the stock price increases and down when the stock price decreases.

Figure 13:
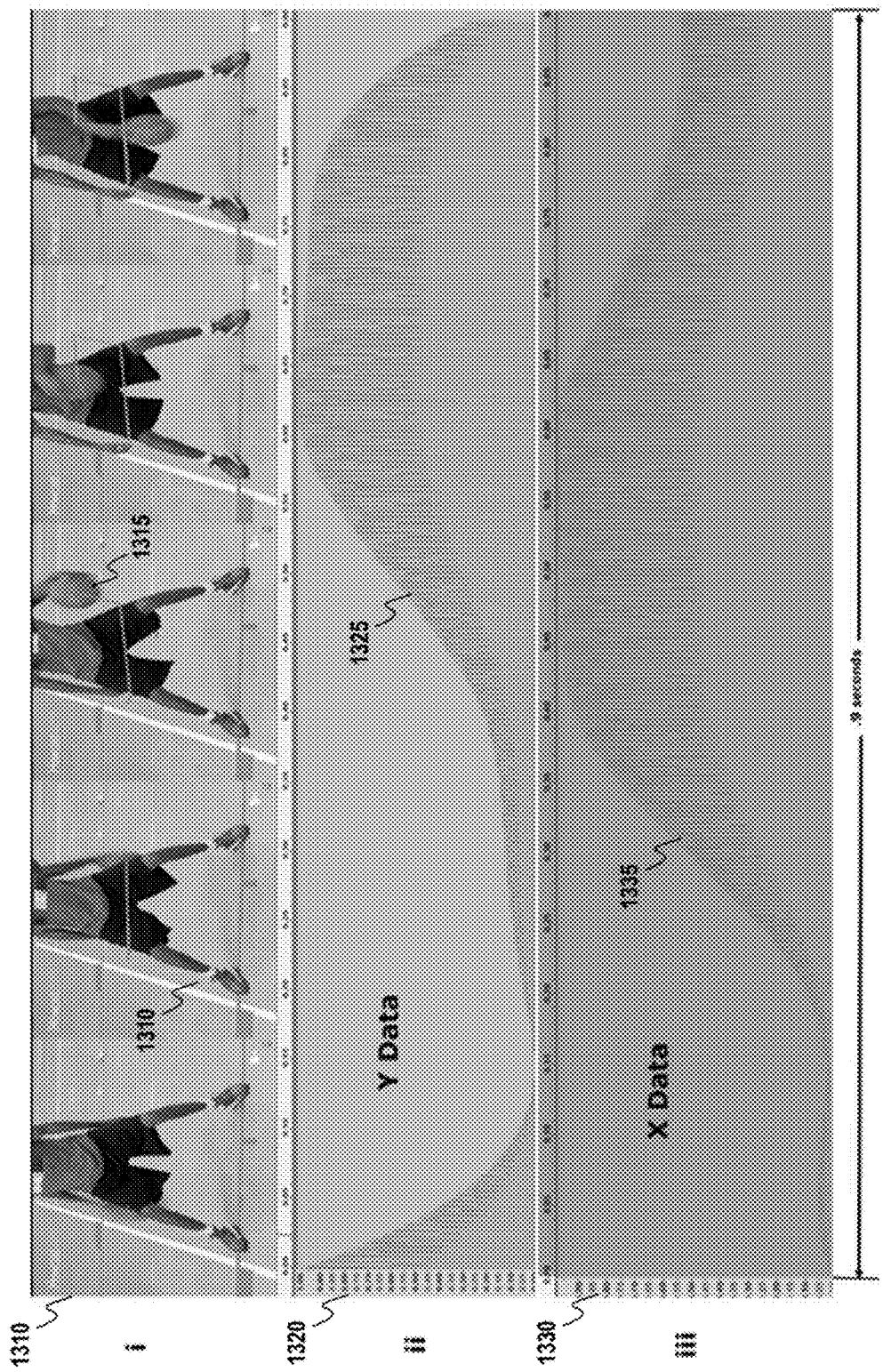

Referring to FIG. 13, graphs 1320 and 1330 illustrate volume levels 1325 and 1335, respectively resulting from modulation of volume based on motion tracking data of a basketball being dribbled. In this example, Y axis data was used to modulate the volume levels of a first WAV file and X axis data was used to modulate the volume levels of a second WAV file. The volume levels of the first WAV file are at a maximum when the basketball location is highest at point 1315 and at a lowest level when the basketball hits a floor 1310. The volume levels of the second WAV file are at a maximum when the basketball is furthest to the right in the image and at a minimum when the basketball is furthest to the left in the image.

Figure 14:
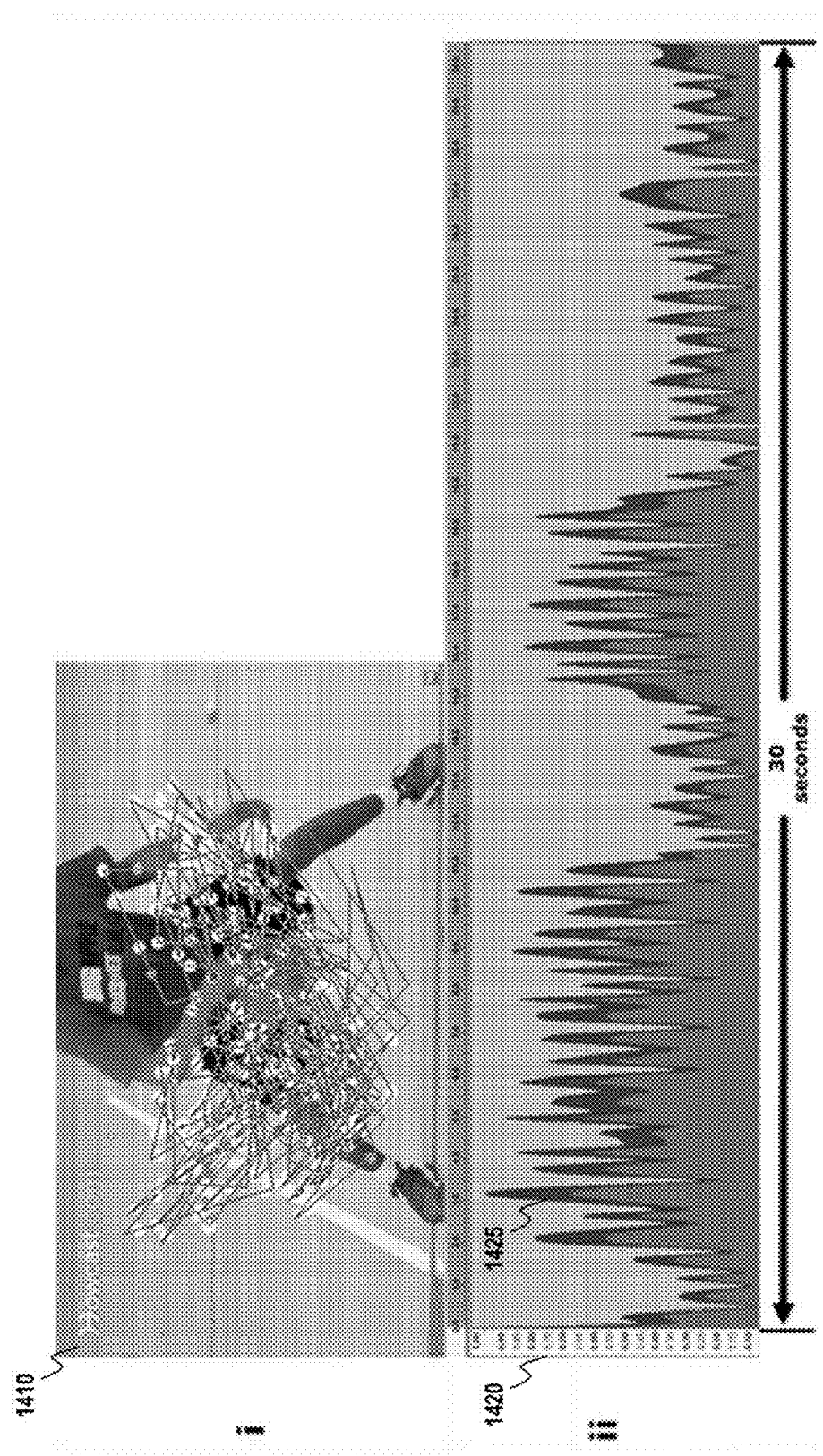

Referring to FIG. 14, a graph 1420 illustrates volume levels 1425 resulting from modulation of volume based on motion tracking data of a video 1410 of a basketball being dribbled for a period of 30 seconds. In this example, Y axis data was used to modulate the volume levels of a WAV file. The volume levels of the WAV file are at a maximum when the basketball location is highest and at a lowest level when the basketball hits a floor.

Although particular embodiments are described above, many variations of the disclosure are possible, including, for example, those with different transistor types, with different biasing arrangements, or with additional amplification stages. Additionally embodiments have been described for CMOS technology but similar circuits may be used with other technologies. Additionally, features of the various embodiments may be combined in combinations that differ from those described above.

The above description of the disclosed embodiments is provided to enable any person skilled in the art to make or use the disclosure. Various modifications to these embodiments will be readily apparent to those skilled in the art, and the generic principles described herein can be applied to other embodiments without departing from the spirit or scope of the disclosure. Thus, it is to be understood that the description and drawings presented herein represent presently preferred embodiments of the disclosure and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A system for generating visual enhancement of one or more areas of interest in a plurality of images of a sequence of images, the system comprising:
   an image area of interest unit configured to receive area of interest data identifying an area of interest and a three dimensional (3D) location in one of the plurality of images;
   an image analysis unit configured to analyze the plurality of images to identify respective 3D locations of the one or more areas of interest in other ones of the plurality of images different than the one of the plurality of images,
   wherein the image analysis unit is configured to identify Z coordinates of the respective 3D locations of the identified area of interest in the other ones of the plurality of images by identifying changes in the size of the one or more areas of interest moving in a direction perpendicular to the plurality of images; and
   an image enhancement unit configured to visually enhance the one or more of the identified areas of interest of the plurality of the images in the sequence of images.

2. The system of claim 1, wherein the sequence of images is video and the plurality of images includes frames of the video.

3. The system of claim 1, wherein the image area of interest unit receives the area of interest data from an input device configured to enable identification of the area of interest by drawing a shape around the area of interest.

4. The system of claim 1, wherein the image enhancement unit visually enhances the one or more of the identified areas of interest by performing at least one of masking, highlighting, magnifying, tracing or motion tracking.

5. The system of claim 1, wherein the image analysis unit is configured to identify X and Y coordinates of the respective 3D locations of the one or more of the areas of interest in the other ones of the plurality of images by measuring pixel distances from left and top sides, respectively, of each image of the sequence of images.

6. The system of claim 1, wherein the sequence of images depicts a 3D graph comprising one or more traces, wherein the areas of interest comprise different portions of the one or more traces, and wherein the image enhancement unit visually enhances the one or more of the identified areas of interest by highlighting the different portions of the one or more traces.

7. A method of generating visual enhancement of one or more areas of interest in a plurality of images of a sequence of images, the method comprising:
   receiving area of interest data identifying an area of interest and a three dimensional (3D) location in one of the plurality of images;
   analyzing the plurality of images to identify respective 3D locations of the one or more areas of interest in other ones of the plurality of images different than the one of the plurality of images;
   visually enhancing the one or more of the identified areas of interest of the plurality of the images in the sequence of images; and
   identifying Z coordinates of the respective 3D locations of the identified area of interest in the other ones of the plurality of images by identifying changes in the size of the one or more areas of interest moving in a direction perpendicular to the plurality of images.

8. The method of claim 7, wherein the sequence of images is video and the plurality of images includes frames of the video.

9. The method of claim 7, wherein the area of interest is identified with an input device by drawing a shape around the area of interest.

10. The method of claim 7, wherein the one or more of the identified areas of interest is visually enhanced by performing at least one of masking, highlighting, magnifying, tracing or motion tracking.

11. The method of claim 7, further comprising identifying X and Y coordinates of the respective 3D locations of the one or more of the areas of interest in the other ones of the plurality of images by measuring pixel distances from left and top sides, respectively, of each image of the sequence of images.

12. The method of claim 7, wherein the sequence of images depicts a 3D graph comprising one or more traces, wherein the areas of interest comprise different portions of the one or more traces, and the method further comprising visually enhancing the one or more of the identified areas of interest by highlighting the different portions of the one or more traces.

13. A non-transitory computer readable medium storing a computer program to generate visual enhancement of one or more areas of interest in a plurality of images of a sequence of images, the computer program comprising executable instructions that cause a computer to:
   receive area of interest data identifying an area of interest and a three dimensional (3D) location in one of the plurality of images;
   analyze the plurality of images to identify respective 3D locations of the one or more areas of interest in other ones of the plurality of images different than the one of the plurality of images;
   visually enhance the one or more of the identified areas of interest of the plurality of the images in the sequence of images; and
   identify Z coordinates of the respective 3D locations of the identified area of interest in the other ones of the plurality of images by identifying changes in the size of the one or more areas of interest moving in a direction perpendicular to the plurality of images.

14. The non-transitory computer readable medium of claim 13, wherein the sequence of images is video and the plurality of images includes frames of the video.

15. The non-transitory computer readable medium of claim 13, further comprising executable instructions that cause the computer to identify X and Y coordinates of the respective 3D locations of the one or more of the area of interest in the other ones of the plurality of images by measuring pixel distances from left and top sides, respectively, of each image of the sequence of images.

16. The non-transitory computer readable medium of claim 13, wherein the one or more of the identified areas of interest is visually enhanced by performing at least one of masking, highlighting, magnifying, tracing or motion tracking.

17. The non-transitory computer readable medium of claim 13, wherein the sequence of images depicts a 3D graph comprising one or more traces, wherein the areas of interest comprise different portions of the one or more traces, and further comprising executable instructions that cause the computer to visually enhance the one or more of the identified areas of interest by highlighting the different portions of the one or more traces.

* * * * *